(12) United States Patent
Yoshii et al.

(10) Patent No.: US 8,125,544 B2
(45) Date of Patent: Feb. 28, 2012

(54) IMAGE PROCESSING APPARATUS FOR EXTRACTING QUADRANGLE AREA IN IMAGE

(75) Inventors: Masakazu Yoshii, Oume (JP); Keiichi Sakurai, Akishima (JP); Ryohei Yamamoto, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 356 days.

(21) Appl. No.: 12/542,897

(22) Filed: Aug. 18, 2009

(65) Prior Publication Data

US 2010/0053410 A1    Mar. 4, 2010

(30) Foreign Application Priority Data

Sep. 2, 2008  (JP) ................ P2008-224709
Mar. 24, 2009 (JP) ................ P2009-072298

(51) Int. Cl.
*H04N 5/208* (2006.01)
(52) U.S. Cl. .............. 348/252; 348/222.1; 382/274
(58) Field of Classification Search .......... 348/222.1, 348/252, 239; 382/274
See application file for complete search history.

(56) References Cited

U.S. PATENT DOCUMENTS 7,480,003 B2    1/2009  Okawara
(Continued)

FOREIGN PATENT DOCUMENTS

JP    2004-271984 A    9/2004
(Continued)

OTHER PUBLICATIONS

Korean Office Action dated Dec. 21, 2010 (and English translation thereof) in counterpart Korean Application No. 10-2009-0082452.

(Continued)

*Primary Examiner* — Tuan Ho
(74) *Attorney, Agent, or Firm* — Holtz, Holtz, Goodman & Chick, PC

(57) ABSTRACT

An image processing apparatus includes: a line segment detecting unit configured to detect vertical line segments and horizontal line segments in an image; a facing-lines candidate generating unit configured to generate vertical and horizontal facing-lines candidates from the vertical and horizontal line segments, the vertical and horizontal facing-lines candidates being candidates for pairs of facing lines configuring quadrangle areas in the image; a rectangle candidate generating unit configured to generate a plurality of pairs of one of the vertical facing-lines candidates and one of the horizontal facing-lines candidates, and to generate the quadrangle areas as rectangle candidates; and a calculating unit configured to calculate likelihood of each of the rectangle candidates based on a relationship between line segments constituting the vertical facing-lines candidates and the horizontal facing-lines candidates and the rectangle candidates.

14 Claims, 20 Drawing Sheets

U.S. PATENT DOCUMENTS

| | | | |
|---|---|---|---|
| 7,606,439 B2 * | 10/2009 | Lefebure et al. | 382/274 |
| 2009/0225180 A1 | 9/2009 | Maruyama et al. | |
| 2009/0278958 A1 * | 11/2009 | Bregman-Amitai et al. | 348/231.99 |
| 2011/0234840 A1 * | 9/2011 | Klefenz et al. | 348/222.1 |

FOREIGN PATENT DOCUMENTS

| | | |
|---|---|---|
| JP | 2005-267457 A | 9/2005 |
| JP | 2007-058634 A | 3/2007 |
| JP | 2007-067847 A | 3/2007 |
| KR | 2008-0038356 A | 5/2008 |

OTHER PUBLICATIONS

Japanese Office Action dated Mar. 8, 2011 (and English translation thereof) in counterpart Japanese Application No. 2009-072298.

Japanese Office Action dated Oct. 26, 2010 (and English translation thereof) in counterpart Japanese Application No. 2008-224709.

* cited by examiner

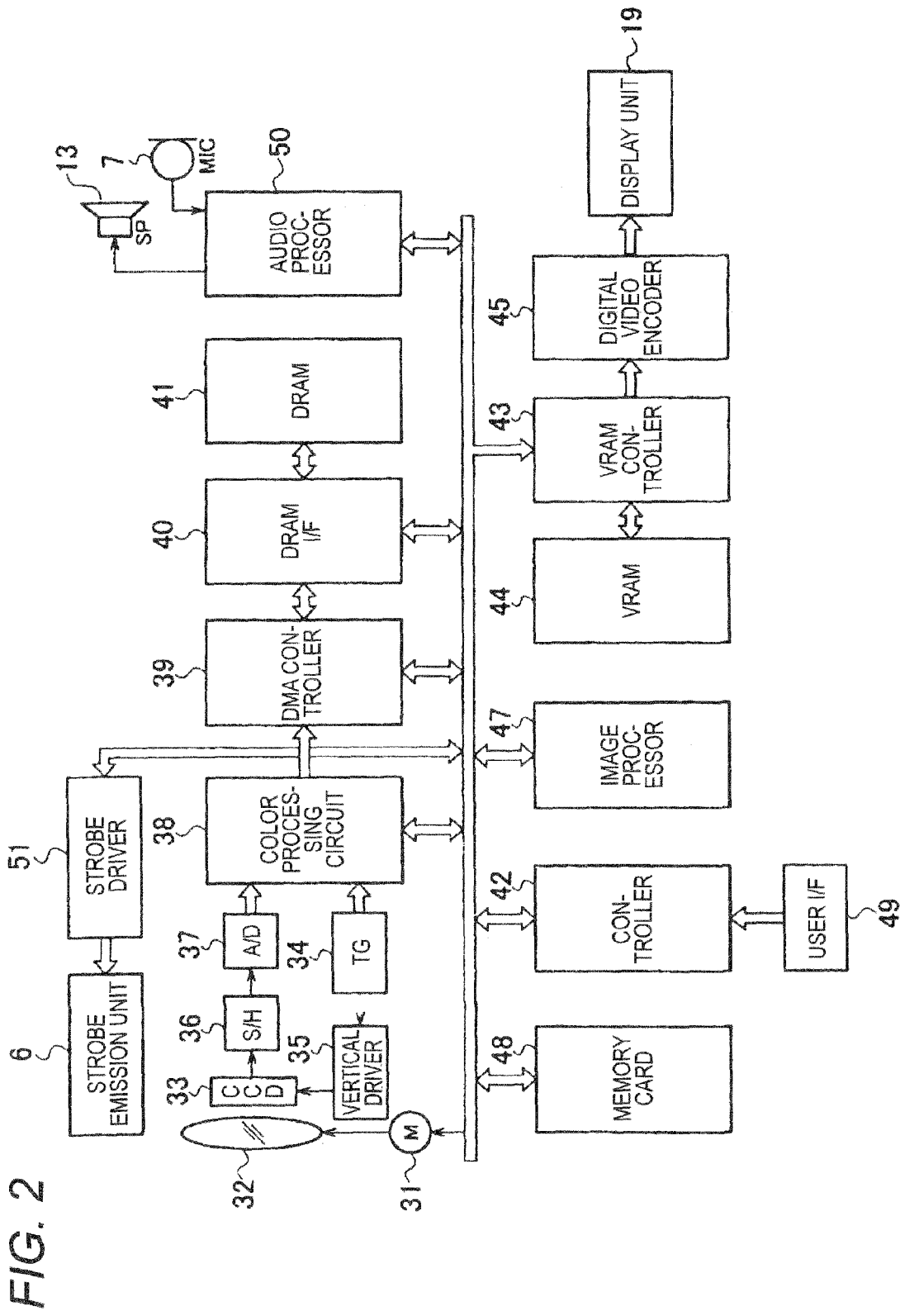

IMAGE DATA

HORIZONTAL EDGE IMAGE

VERTICAL EDGE IMAGE

HORIZONTAL EDGE IMAGE

VERTICAL EDGE IMAGE

HORIZONTAL EDGE IMAGE

VERTICAL EDGE IMAGE

HORIZONTAL FACING-LINES
CANDIDATE

VERTICAL FACING-LINES
CANDIDATE

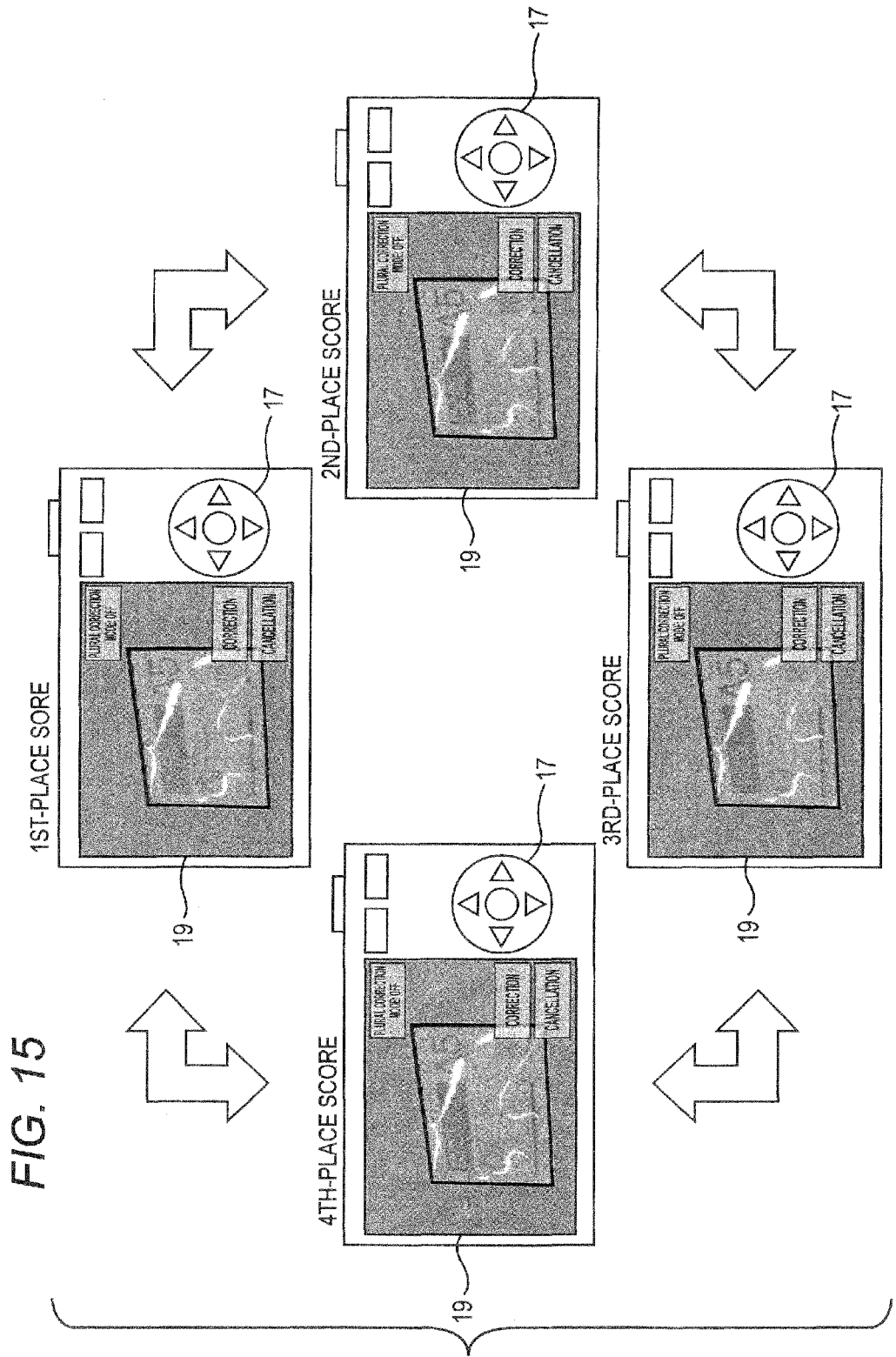

| RECTANGLE CANDIDATE | SETS OF COORDINATES OF CORNER POINTS | COORDINATES OF CENTER OF GRAVITY | PERIMETER LENGTH |
|---|---|---|---|
| S1 | (166,66) (434,85) (435,282) (171,286) | (299,179) | 479 |
| S2 | (158,59) (434,80) (437,285) (161,292) | (294,179) | 500 |
| S3 | (75,340) (357,330) (358,530) (80,567) | (215,442) | 500 |
| S4 | (75,340) (357,330) (358,530) (76,575) | (213,444) | 506 |
| S5 | (68,340) (365,328) (366,536) (76,575) | (216,445) | 522 |

IMAGE PROCESSING APPARATUS FOR EXTRACTING QUADRANGLE AREA IN IMAGE

CROSS-REFERENCE TO THE RELATED APPLICATION(S)

The present application is based upon and claims priority from prior Japanese Patent Application No. 2008-224709, filed on Sep. 2, 2008, and from prior Japanese Application No. 2009-072298, filed on March 24, 2009, the entire contents of which are incorporated herein by reference.

TECHNICAL FIELD

The present invention relates to an image processing apparatus and a computer program for extracting a quadrangle area including a subject contour from an image.

BACKGROUND

There is known an image capturing devices having a function, which is called a contour quadrangle extracting function, for extracting a quadrangle area including a subject contour from an image to enable image processing such as coordinate conversion on a subject image that is included in a captured image. Such image capturing devices extract the quadrangle area by detecting plural straight lines constituting a subject contour from edge images that include edge pixels and represent the subject contour using Hough transform and then selecting straight lines that form the quadrangle area from the detected plural straight lines. An example of such image capturing devices is disclosed in JP-A-2005-267457.

In the conventional image capturing devices, the number of edge pixels located on each of detected straight lines in edge images is calculated and straight lines to form a quadrangle area are selected according to the largeness of the calculated numbers of edge pixels. However, according to this configuration, an inadequate quadrangle area may be extracted in the case where the size of a quadrangle area to be extracted is unknown or plural subject images exist in one image.

Furthermore, in the conventional image capturing devices, in the case where a captured image includes plural subject images, plural quadrangle area candidates (hereinafter abbreviated as "rectangle candidates") are displayed on a display screen in descending order of the evaluation value such as the size of the quadrangle area and the user selects a rectangle candidate to be used for image processing from the plural rectangle candidates being displayed on the display screen. However, in the above configuration of the conventional image capturing devices, the user cannot select a rectangle candidate smoothly because of phenomena that a displayed rectangle candidate is switched between different subject images and that another rectangle candidate is displayed for a subject image for which a rectangle candidate has already been selected.

SUMMARY

One aspect of the invention provides an image processing apparatus including: a line segment detecting unit configured to detect vertical line segments and horizontal line segments in an image; a facing-lines candidate generating unit configured to generate vertical facing-lines candidates and horizontal facing-lines candidates from the vertical line segments and the horizontal line segments, the vertical facing-lines candidates and horizontal facing-lines candidates being candidates for pairs of facing lines configuring quadrangle areas in the image; a rectangle candidate generating unit configured to generate a plurality of pairs of one of the vertical facing-lines candidates and one of the horizontal facing-lines candidates, and to generate the quadrangle areas as rectangle candidates, the quadrangle areas having intersecting points of each pair of the vertical facing-lines candidates and the horizontal facing-lines candidates as four corner points; and a calculating unit configured to calculate likelihood of each of the rectangle candidates based on a relationship between line segments constituting the vertical facing-lines candidates and the horizontal facing-lines candidates and the rectangle candidates.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

FIGS. 1A and 1B are perspective views showing a configuration of a digital camera according to a first embodiment of the invention, wherein FIG. 1A is a perspective view mainly showing components provided in the front face, and wherein FIG. 1B is a perspective view mainly showing components provided in the back face.

FIG. 2 is a block diagram showing a configuration of a control system of the digital camera shown in FIGS. 1A and 1B.

FIG. 15 shows how a transition is made between rectangle candidates, which are arranged imaginarily in descending order of the score, and the destination rectangle candidate is displayed every time the user makes a operation.

DETAILED DESCRIPTION

Figure 1A:
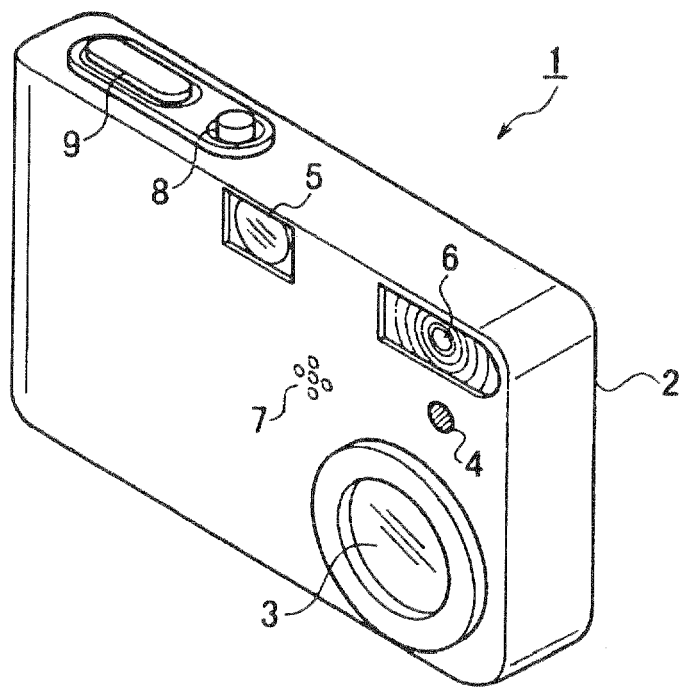

The embodiments according to the present invention will be described in detail with reference to the accompanying drawings. The scope of the claimed invention should not be limited to the examples illustrated in the drawings and those described below.

First Embodiment

A configuration of a digital camera according to a first embodiment of the invention will be hereinafter described in detail.

First, the entire configuration of the digital camera 1 according to the first embodiment of the invention will be described with reference to FIGS. 1A and 1B.

As shown in FIG. 1A, the digital camera 1 according to the first embodiment of the invention is equipped with an imaging lens 3, a timer indicator 4, a finder window 5, a strobe emission unit 6, and a microphone 7 in the front face of a generally rectangular, flat-box-shaped body (hereinafter abbreviated as a body) 2. The top face of the body 2 is provided with a power switch 8 and a shutter button 9 at right-hand positions (as viewed from the user). The imaging lens 3, with which a zoom function of steplessly varying the focal length and an AF (auto focus) function are realized, is retracted in the body 2 in a power-off state and in a playing mode. The power switch 8 is a switch that is operated to turn on or off the power and the shutter button 9 is a button that is operated to command shooting timing in a recording mode.

Figure 1B:
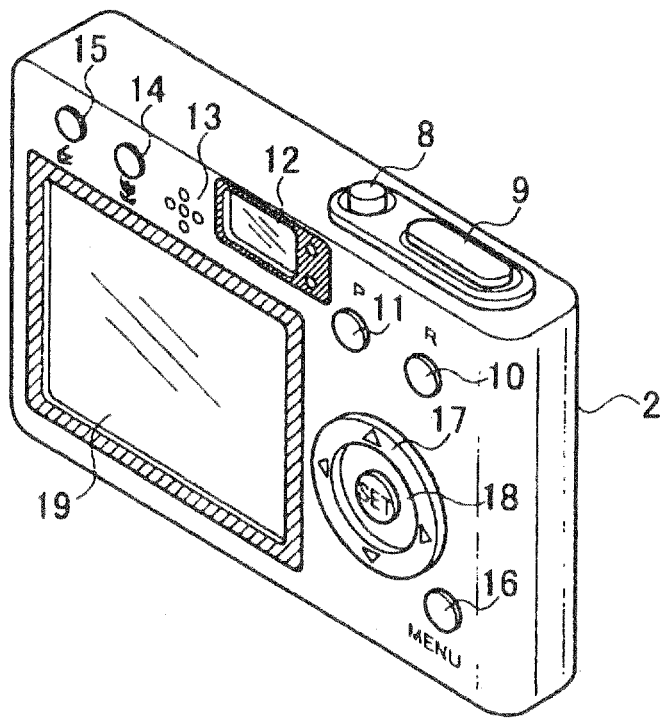

As shown in FIG. 1B, a recording mode (R) key 10, a playing mode (P) key 11, an electronic view finder (EVF) 12, a speaker 13, a macro key 14, a strobe key 15, a menu key 16, a ring key 17, a set key 18, and a display unit 19 are provided n the back face of the body 2. When the recording mode key 10 is operated in a power-off state, the power is turned on automatically and a transition is made to a still image recording mode. On the other hand, when the recording mode key 10 is operated repeatedly in a power-on state, the still image recording mode and a moving image recording mode are set cyclically. In the first embodiment, the still image recording mode includes a single shot mode in which an ordinary shooting operation is performed at a given exposure time and a multi-shot mode in which a subject is shot consecutively at an exposure time that is shorter than in the single shot mode and a single image is generated by combining plural image frames.

When the playing mode key 11 is operated in a power-off state, the power is turned on automatically and a transition is made to the playing mode. The EVF 12, which is an eyepiece-type finder using a liquid crystal display screen, displays a live view image on the liquid crystal display screen in the recording mode and reproduction-displays a selected image, for example, in the playing mode. The macro key 14 is operated to switch between ordinary shooting and macro shooting in the still image recording mode. The strobe key 15 is operated to switch the emission mode of the strobe emission unit 6. The menu key 16 is operated to perform a selection such as selecting one of various menu items. The ring key 17 is a monolithically formed with upward, downward, rightward, and leftward item selection keys. The set key 18 which is located at the center of the ring key 17 is operated to set a configuration on a currently selected item.

The display unit 19, which is a color liquid crystal display panel with a backlight, monitor-displays a live view image in the recording mode and reproduction-displays a selected image, for example, in the playing mode. A display device other than a liquid crystal display panel may be used as a display unit that replaces the display unit 19. Although not shown in FIG. 1A or 1B, the bottom face of the digital camera 1 is provided with, for example, a memory card slot in or from which a memory card as a storage medium is inserted or removed, a USB (universal serial bus) connector which is a serial interface connector for connection to an external personal computer or the like.

Figure 3:
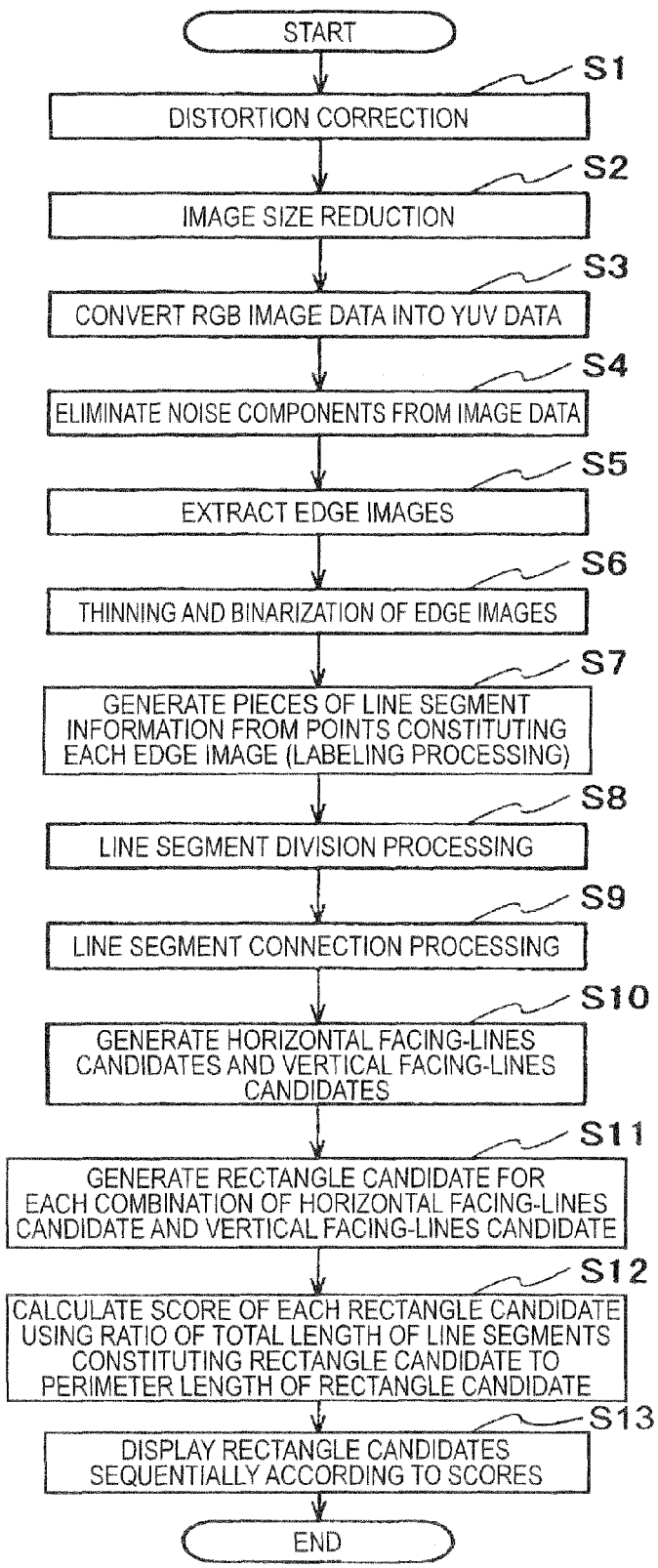
FIG. 3 is a flowchart of a contour quadrangle extraction process according to the first embodiment.

Next, the configurations of an imaging system and a control system of the digital camera 1 according to the first embodiment will be described with reference to FIGS. 2 and 3.

In the digital camera 1 according to the first embodiment, a CCD 33 is an imaging device disposed behind a lens optical system 32 on its imaging optical axis. The lens optical system 32 constitutes the imaging lens 3 and its focusing position and stop position are moved when it is driven by a motor (M) 31. In the recording mode, the CCD 33 is scan-driven by a timing generator (TG) 34 and a vertical driver 35 and produces, every predetermined period, a photoelectric conversion output of one frame that corresponds to an optical image formed. The photoelectric conversion output, more specifically, analog signals of respective primary color components (R, G, and B), is gain-adjusted properly, sampled and held by a sample hold circuit (S/H) 36, and converted by an A/D converter 37 into digital data, which are subjected to color processing including pixel interpolation and γ correction by a color processing circuit 38. As a result, a digital luminance signal Y and color-difference signals Cb and Cr are generated, which are output to a DMA (direct memory access) controller 39.

The DMA controller 39 writes the luminance signal Y and the color-difference signals Cb and Cr to a buffer that is provided in the DMA controller 39 using a composite sync signal, a memory write enable signal, and a clock signal which are also output from the color processing circuit 38, and then DMA-transfers those signals to a DRAM 41 (used as a buffer memory) via a DRAM interface (I/F) 40. A controller 42, which is composed of a CPU, a ROM in which computer programs to be run by the CPU are stored in a fixed manner, a RAM which is used as a work memory, and other devices, controls operations of the entire digital camera 1.

After completion of the DMA transfer of the luminance signal Y and the color-difference signals Cb and Cr to the DRAM 41, the controller 42 reads the luminance signal Y and the color-difference signals Cb and Cr from the DRAM 41 via the DRAM I/F 40 and writes those signals to a VRAM 44 via a VRAM controller 43. A digital video encoder 45 reads the luminance signal Y and the color-difference signals Cb and Cr from the VRAM 44 via the VRAM controller 43 on a regular basis, generates a video signal based on those signals, and outputs the generated video signal to the EVF 12 and the display unit 19. Each of the EVF 12 and the display unit 19 performs display based on the video signal supplied from the digital video encoder 45 and thereby displays, in real time, an image corresponding to current image information being taken in from the VRAM controller 43.

If the shutter button 9 is operated with timing of intended still image shooting in a state that what is called a live view image is displayed (i.e., as described above a current image is displayed as a monitor image in real time on each of the EVF 12 and the display unit 19), a trigger signal is generated. In response to the trigger signal, the controller 42 suspends the DMA transfer, to the DRAM 41, of a luminance signal Y and color-difference signals Cb and Cr of one frame being taken in from the CCD 33, acquires a new luminance signal Y and color-difference signals Cb and Cr of one frame by newly driving the CCD 33 with an aperture and a shutter speed that are suitable for proper exposure conditions, and transfers those signals to the DRAM 41. Then, the controller 42 stops the use of this route and causes a transition to a recording (storing) state.

In the recording (storing) state, the controller 42 reads the luminance signal Y and the color-difference signals Cb and Cr individually from the DRAM 41 via the DRAM interface 40, and writes those signals to an image processor 47. The image processor 47 compresses the data by ADCT (adaptive discrete cosine transform), Huffman coding which is an entropy coding method, or the like. The resulting code data is read from the image processor 47 and written to one of a memory card 48 which is inserted in a detachable manner as a recording medium of the digital camera 1 and a built-in memory (not shown) which is built in the digital camera 1 in a fixed manner. Upon completion of the compression of the luminance signal Y and the color-difference signals Cb and Cr and writing of all the compressed data to the memory card 48 or the built-in memory, the controller 42 again activates the route from the CCD 33 to the DRAM 41.

A user interface 49, an audio processor 50, and a strobe driver 51 are connected to the controller 42. The user interface 49 is composed of the above-described power switch 8, shutter button 9, recording mode key 10, a playing mode key 11, macro key 14, strobe key 15, menu key 16, ring key 17, set key 18, etc. A signal produced by operating each of those keys is sent directly to the controller 42. Equipped with a sound source circuit such as a PCM sound source, during recording of a sound the audio processor 50 digitizes an audio signal that is supplied from the microphone 7, generates an audio data file by compressing the data according to a given data file format, for example, according to the MPS (MPEG-1 audio layer 3) standard, and sends the compressed data to the memory card 48 or the built-in memory. On the other hand, during reproduction of a sound, the audio processor 50 expands an audio data file sent from the memory card 48 or the built-in memory, converting the data into an analog signal, and outputs an amplified sound by driving the speaker (SP) 13. When performing still image shooting, the strobe driver 51 charges up a strobe large-capacitance capacitor (not shown) and drives the strobe emission unit 6 to flash under the control of the controller 42.

The above-configured digital camera 1 extracts a quadrangle area including a subject contour by performing a contour quadrangle extraction process (described below). How the digital camera 1 operates in performing the contour quadrangle extraction process will be described below with reference to a flowchart shown in FIG. 3.

Image capturing (shooting) is performed after the user selects such a mode as "shooting of a name card or a document" or "shooting of a white board" from recording modes for respective scenes by operating the ring key 17 and the set key 18. In these modes, a subject skewing correction is performed. An image taken in one of these modes is taken in by the image processor 47, and the contour quadrangle extraction process shown in FIG. 3 is started from step S1 with timing that it has become executable. The operation to be described below of the digital camera 1 is implemented in such a manner that the CPU of the controller 42 loads a computer program stored in the ROM into the RAM and runs the computer program to control the image processing performed by the image processor 47.

Here, it is assumed that the following image processing including various processing units is performed by the image processor 47 under the control of the controller 42. Which means that each of the processing units included in the image processing is implemented as a software configuration. However, any one or more of the processing units included in the image processing may be implemented as a hardware configuration, such as by an ASIC. In addition, all of those processing units may not be performed by a single component. Any one or more of the processing units included in the image processing may be performed by a plurality of cooperatively operating components.

At step S1, the image processor 47 performs distortion correction processing on the input captured image, whereby the captured image which is distorted due to the lens characteristics of the lens optical system 32 is corrected. Step S1 is thus completed and the contour quadrangle extraction process proceeds to step S2.

At step S2, the image processor 47 reduces the size of the captured image (image size) as subjected to the distortion correction to a given size. More specifically, the image processor 47 calculates a size of the captured image as subjected to the distortion correction and reduces the horizontal and vertical lengths of the captured image based on the calculated size so that the captured image size becomes 320 (horizontal)×240 (vertical) pixels. Step S2 is thus completed and the contour quadrangle extraction process proceeds to step S3.

At step S3, the image processor 47 converts the representation form of the color information of the captured image from the bit map form into the YUV form (Y: luminance signal, U: difference between the luminance signal and the blue component, V: difference between the luminance signal and the red component) Step S3 is thus completed and the contour quadrangle extraction process proceeds to step S4.

At step S4, the image processor 47 eliminates noise components from the image data of the captured image by applying a median filter to the image data. The median filter used in the embodiment is such that pixel values of a local area of 3×3 pixels are arranged in ascending order and the pixel value of a center pixel of the arrangement is employed as a pixel value of the center pixel of the area. Step S4 is thus completed and the contour quadrangle extraction process proceeds to step S5.

Figure 4A:
FIGS. 4A-4C show example image data and example edge images extracted by edge image extraction processing in step S5 of the process shown in FIG. 3.
Figure 4B:
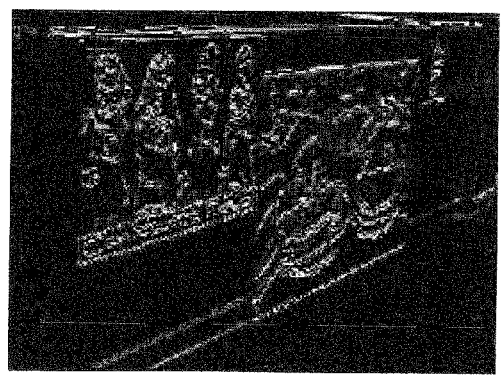
Figure 4C:
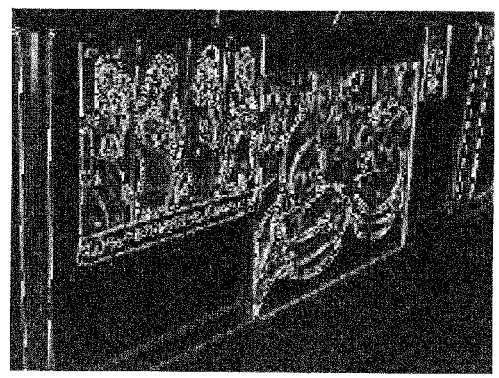
Figure 5:
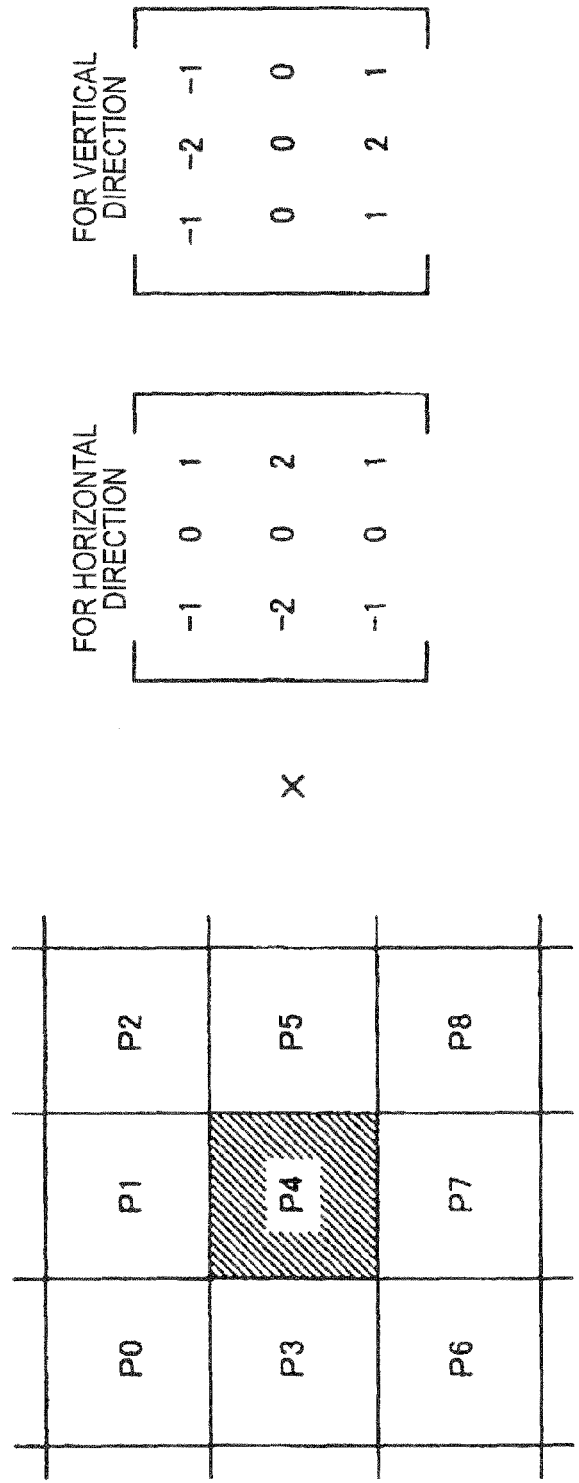
FIG. 5 shows the configuration of a Sobel filter which is used at step S5 of the process shown in FIG. 3.

At step 5, as shown in FIGS. 4A, 4B, and 4C, the image processor 47 extracts edge images by extracting vertical (X direction) edges and horizontal (Y direction) edges from the noise-components-eliminated image data. In the embodiment, the image processor 47 extracts each of a vertical edge image and a horizontal edge image using a Sobel filter which detects a contour by calculating a spatial first-order derivative (see FIG. 5). Step S5 is thus completed and the contour quadrangle extraction process proceeds to step S6.

Figure 6A:
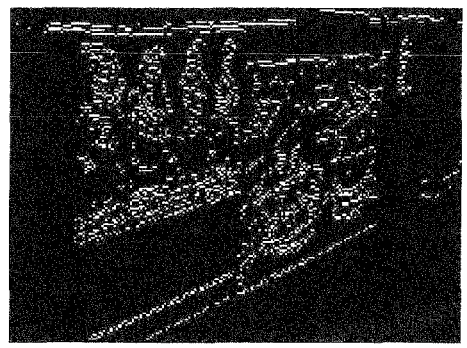
FIGS. 6A and 6B show example edge images as obtained by thinning and binarization of step S6 of the process shown in FIG. 3.
Figure 6B:
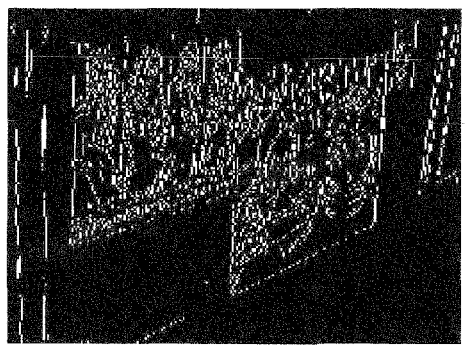

At step S6, as shown in FIGS. 6A and 6B, the image processor 47 performs thinning and binarization on each of the vertical edge image and the horizontal edge image that were extracted at step S5. More specifically, the image processor 47 detects, from the edge pixels included in the vertical edge image, pixels whose x coordinates satisfy a condition (pixel value at x−1)<(pixel value at x)≧(pixel value at x+1). Likewise, the image processor 47 detects, from the edge pixels included in the horizontal edge image, pixels whose y coordinates satisfy a condition (pixel value at y−1)<(pixel value at y)≧(pixel value at y+1). Then, the image processor 47 sets the pixel values of the extracted pixels at the coordinates x or y among the pixels constituting the vertical edge image or the horizontal edge image to "255" and those of the other pixels to "0." Step S6 is thus completed and the contour quadrangle extraction process proceeds to step S7.

Figure 7A:
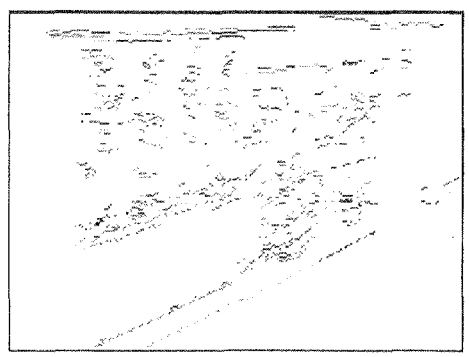
FIGS. 7A and 7B show line example pieces of segment information obtained by labeling processing of step S7 of the process shown in FIG. 3.
Figure 7B:
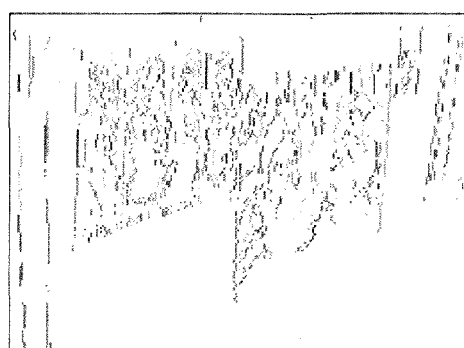

At step S7, the image processor 47 performs labeling processing on each of the vertical edge image and the horizontal edge image, whereby pieces of vertical line segment information and pieces of horizontal line segment information to constitute a subject contour (see FIGS. 7A and 7B) are generated. In the embodiment, for the horizontal edge image, the image processor 47 tries to detect an edge pixel included in the edge image by performing a scan in the X direction from x=0 while referring to pixels that are adjacent in the Y direction. When an edge pixel is detected, the image processor 47 determines whether the detected edge pixel has the pixel value "255" and is connected to other pixels. In a case where the detected edge pixel has the pixel value of "255" but is not connected to any other pixel, the image processor 47 starts tracing a line segment including the detected edge pixel in the X direction. More specifically, the image processor 47 performs tracing on three points (x+1, y−1), (x+1, y), and (x+1, y+1) that are located on the right of the tracing start position (x, y).

If one of the following conditions is satisfied, the image processor 47 assigns a unique number to the line segment (i.e., performs labeling) and finishes its tracing. Where the tracing should be continued, the image processor 47 sets the x coordinate of the last-detected edge pixel as a start position of the next tracing.

Condition 1: Among the three points, at least one point is already labeled.

Condition 2: Among the three points, at least two points are pixels that belong to the edge image.

Condition 3: During the tracing, a pixel belonging to the edge image is not detected for two of the three points.

On the other hand, for the vertical edge image, the image processor 47 detects an edge pixel included in the edge image by performing a scan in the X direction from y=0 and performs the same processing as the processing performed for the horizontal edge image. Then, for each line segment labeled by the tracing, the image processor 47 calculates, as line segment information, start point coordinates, end point coordinates, a slope (calculated from the start point coordinates and the end point coordinates), an average of errors, from the slope line, of the respective points constituting the line segment (i.e., displacements in the X direction (in the case of a vertical line segment or in the Y direction (in the case of a horizontal line segment), coordinates of a point having a maximum error, and the maximum error. Step S7 is thus completed and the contour quadrangle extraction process proceeds to step S8.

Figure 8:
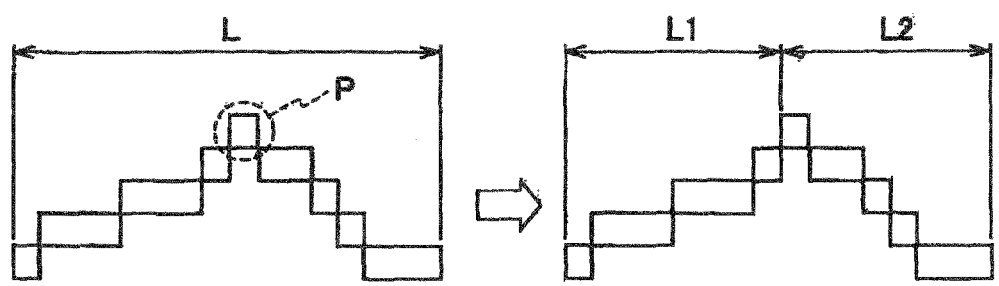
FIG. 8 is a schematic diagram illustrating line segment division processing of step S8 of the process shown in FIG. 3.

At step S8, by referring to the pieces of line segment information generated at step S7, the image processor 47 determines whether there exists a line segment whose maximum value of errors from the slope line is larger than or equal to a given value. If such a line segment exists, as shown in FIG. 8 the image processor 47 divides the line segment into two line segments at the maximum-error point (in the example shown in FIG. 8, point P). The dividing point may be included in the shorter one of the divisional line segments. The image processor 47 does not divide the line segment if its length is greater than or equal to a first threshold value or the length of a divisional line segment will be shorter than or equal to a second threshold value. The image processor 47 updates the pieces of line segment information if a line segment(s) is divided. Step S8 is thus completed and the contour quadrangle extraction process proceeds to step S9.

Figure 9:
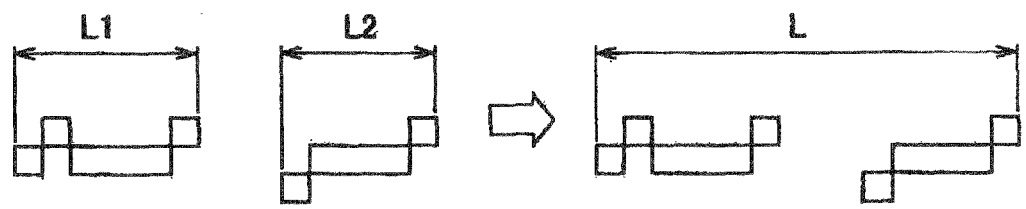
FIG. 9 is a schematic diagram illustrating line segment connection processing of step S9 of the process shown in FIG. 3.

At step S9, the image processor 47 extracts, as connection source line segments, a given number of line segments whose lengths are greater than or equal to a given value (selected in order from the longest one) by referring to the pieces of line segment information that were updated at step S8 and, as shown in FIG. 9, connects each connection source line segment to a line segment (connection destination line segment) that satisfies the following three conditions. Then, the image processor 47 calculates, by the least squares method, start point coordinates and end point coordinates of a line segment formed by connecting each connection source line segment to a connection destination line segment. Step S9 is thus completed and the contour quadrangle extraction process proceeds to step S10.

Condition 1: The distance between the connection destination line segment and the connection source line segment is smaller than a given value.

Condition 2: The connection source line segment is not completely included in the connection destination line segment.

Condition 3: When the connection source line segment is extended from its start point or end point to the connection destination line segment, errors of the extension of the connection source line segment from the positions of its start point and end point are smaller than a given value.

Figure 10A:
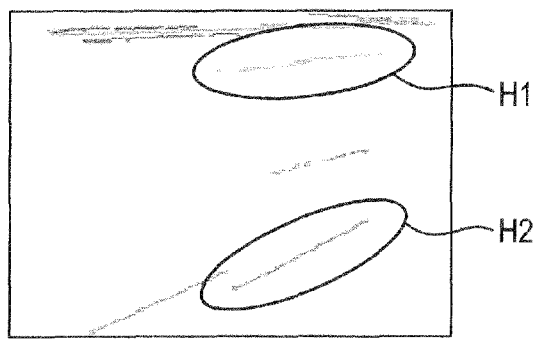
FIGS. 10A and 10B show an example horizontal facing-lines candidate and an example vertical facing-lines candidate, respectively, obtained by pairing processing of step S10 of the process shown in FIG. 3.
Figure 10B:
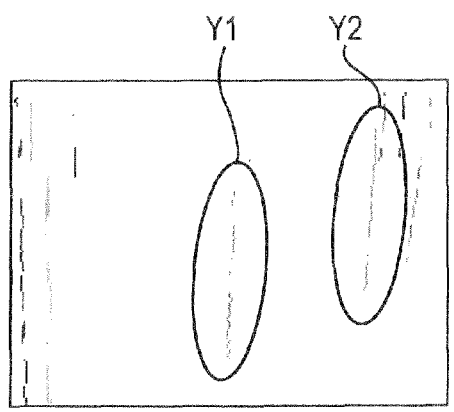

At step S10, as shown in FIGS. 10A and 10B, the image processor 47 generates a candidate for a pair of facing edge lines; hereinafter simply referred to as "facing-lines candidate") of each quadrangle from each of the set of vertical line segments and the set of horizontal line segments as subjected to the division processing of step S8 and the connection processing of step S9. (In the example of FIGS. 10A and 10B, a pair of line segments H1 and H2 constitutes a horizontal facing-lines candidate and a pair of line segments V1 and V2 constitutes a vertical facing-lines candidate.) More specifically, the image processor 47 generates, as facing-lines candidates, plural pairs of line segments in each of the vertical direction and the horizontal direction, the line segments of each pair being such that their distance is greater than or equal to a given value and the ratio between their lengths is within a given range (e.g., ⅓ to 3). Step S10 is thus completed and the contour quadrangle extraction process proceeds to step S11.

Figure 11:
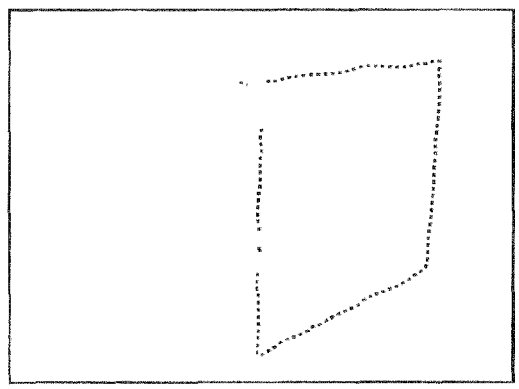
FIG. 11 shows an example rectangle candidate obtained at step S11 of the process shown in FIG. 3.
Figure 12:
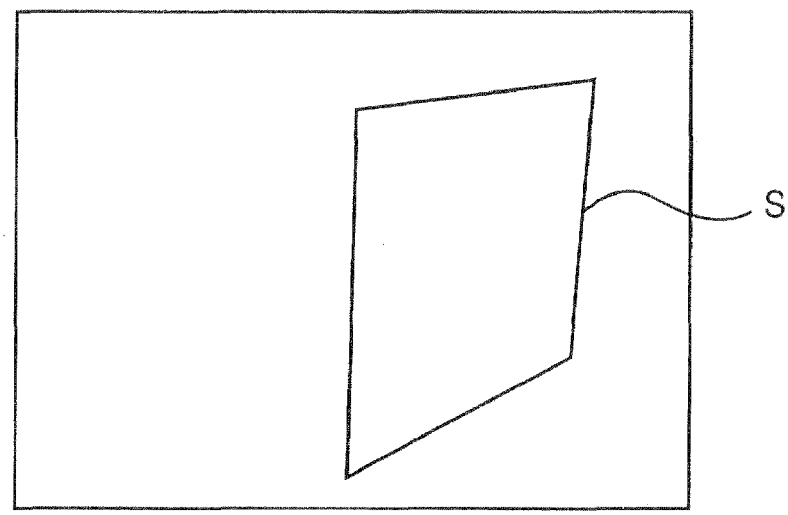
FIG. 12 shows that a perimeter length of the example rectangle candidate shown in FIG. 11 is calculated at step S12 of the process shown in FIG. 3.

At step S11, as shown in FIG. 11, the image processor 47 generates combinations from the vertical facing-lines candidates and the horizontal facing-lines candidates generated at step S10. Then, for each combination, the image processor 47 calculates four intersecting points of the facing-lines candidates using only the slope information of each line segment. An intersecting point may be set on an extension(s) of a line segment(s), that is, the line segments concerned need not intersect there actually. The image processor 47 then generates plural rectangle candidates S each having calculated four intersecting points as corner points (see FIG. 12). Step S11 is thus completed and the contour quadrangle extraction process proceeds to step S12.

Figure 13:
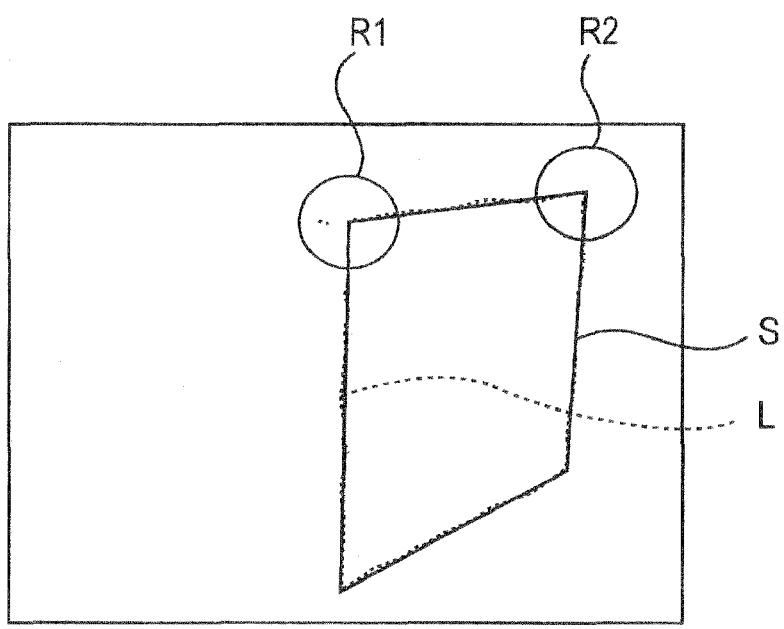
FIG. 13 illustrates scoring processing of step S12 of the process shown in FIG. 3.
Figure 14B:
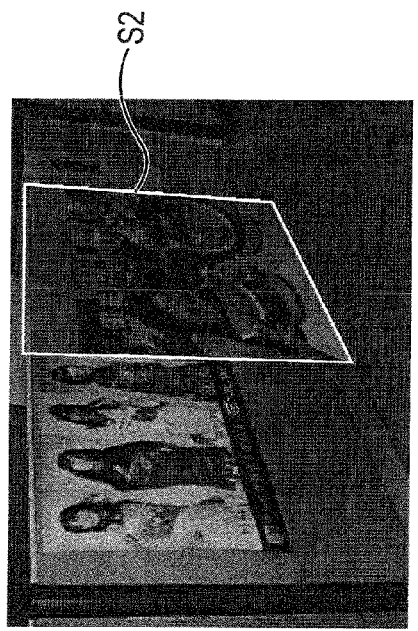
FIGS. 14A-14D show example rectangle candidates that are arranged imaginarily in descending order of scores calculated at step S12 of the process shown in FIG. 3 and displayed one at a time.
Figure 14D:
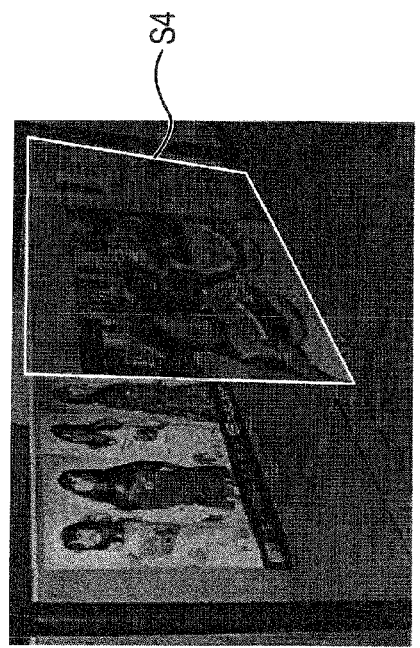
Figure 14A:
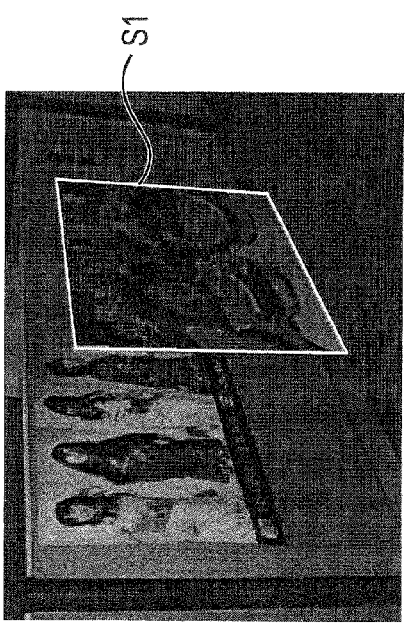
Figure 14C:
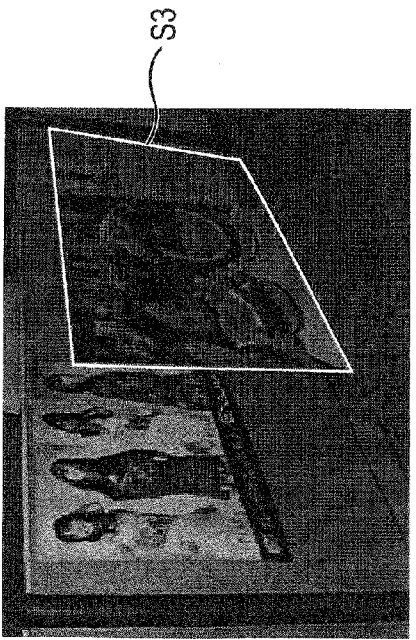

At step S12, the image processor 47 calculates a perimeter length L1 of each rectangle candidate S generated at step S11. The perimeter length L1 can be calculated by adding up the distances between the four corner points of the rectangle candidate S. The image processor 47 also calculates, as shown in FIG. 13, a total length L2 of parts of the vertical and horizontal line segments L, the parts being located on circumferential edges of each of the rectangle candidates S. Then, according to the following Expression (1), the image processor 47 calculates, as a score of each rectangle candidate S (likelihood of a quadrangle area), a ratio of the total length L2 of the line segments L to the perimeter length L1 of the rectangle candidate S (scoring processing). In Expression (1), the coefficient P means a penalty coefficient for reducing the score of the rectangle candidate S in the case where a line segment has a portion that extends past any of the four corner points of the rectangle candidate S (e.g., portions shown in regions R1 and R2 in FIG. 13 which project from the perimeter of the rectangle candidate S). For example, the penalty coefficient is set at 1.0 if there is no such portion, 0.8 if one such portion exists, and 0.64 if two such portions exist. The values of the penalty coefficient are not limited to these values and various modifications are possible in this respect. For example, where a subject has a fixed shape and its aspect ratio is known, the penalty coefficient may be set smaller (smaller than 1.0) as the calculated aspect ratio deviates more from the known value. Where the perimeter length of a subject is known, the penalty coefficient may be set smaller (smaller than 1.0) as the calculated perimeter length deviates more from the known value. Step S12 is thus completed and the contour quadrangle extraction process proceeds to step S13.

$$\text{score} = (L2/L1) \times 100 \times P \quad (1)$$

At step S13, for example, as shown in FIGS. 14A-14D, the image processor 47 arranges rectangle candidates S1-S4 imaginarily in descending order of scores (i.e., degrees of likelihood) calculated at step S12 and displays them one at a time to be overlapped on the captured image. More specifically, as shown in FIG. 15, the image processor 47 displays rectangle candidates, which are arranged imaginarily in descending order of likelihood, on the display unit 19 one at a time (cyclically) every time the user operates the ring key 17. Although in the example shown in FIG. 15 the rectangle candidates which are arranged imaginarily in descending order of likelihood are displayed on the display unit 19 one at a time, they may be displayed together on the display unit 19 in different colors according to their scores.

Figure 16:
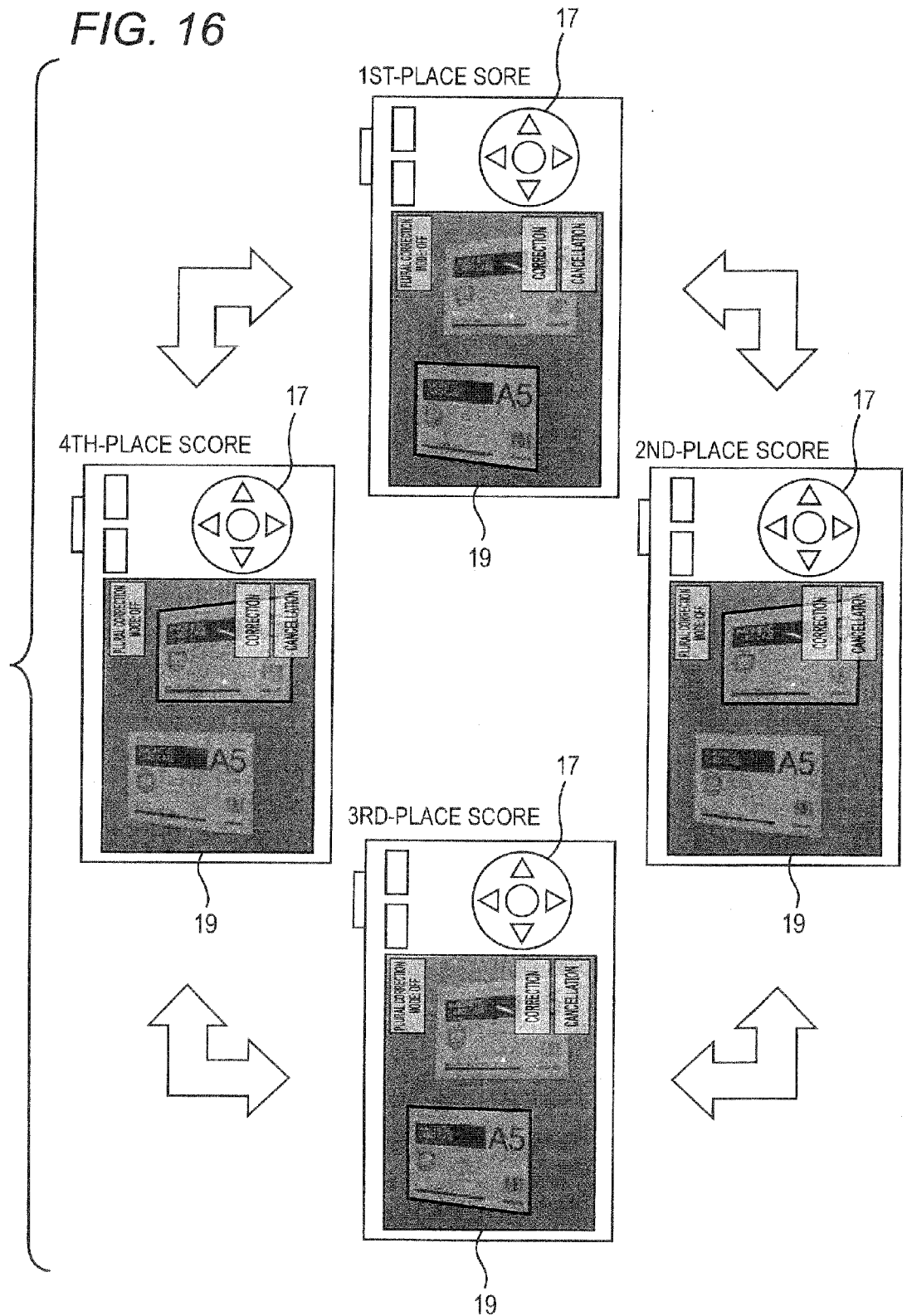
FIG. 16 shows a manner of display of rectangle candidates in a case that plural subject images are included in a captured image.
Figure 17:
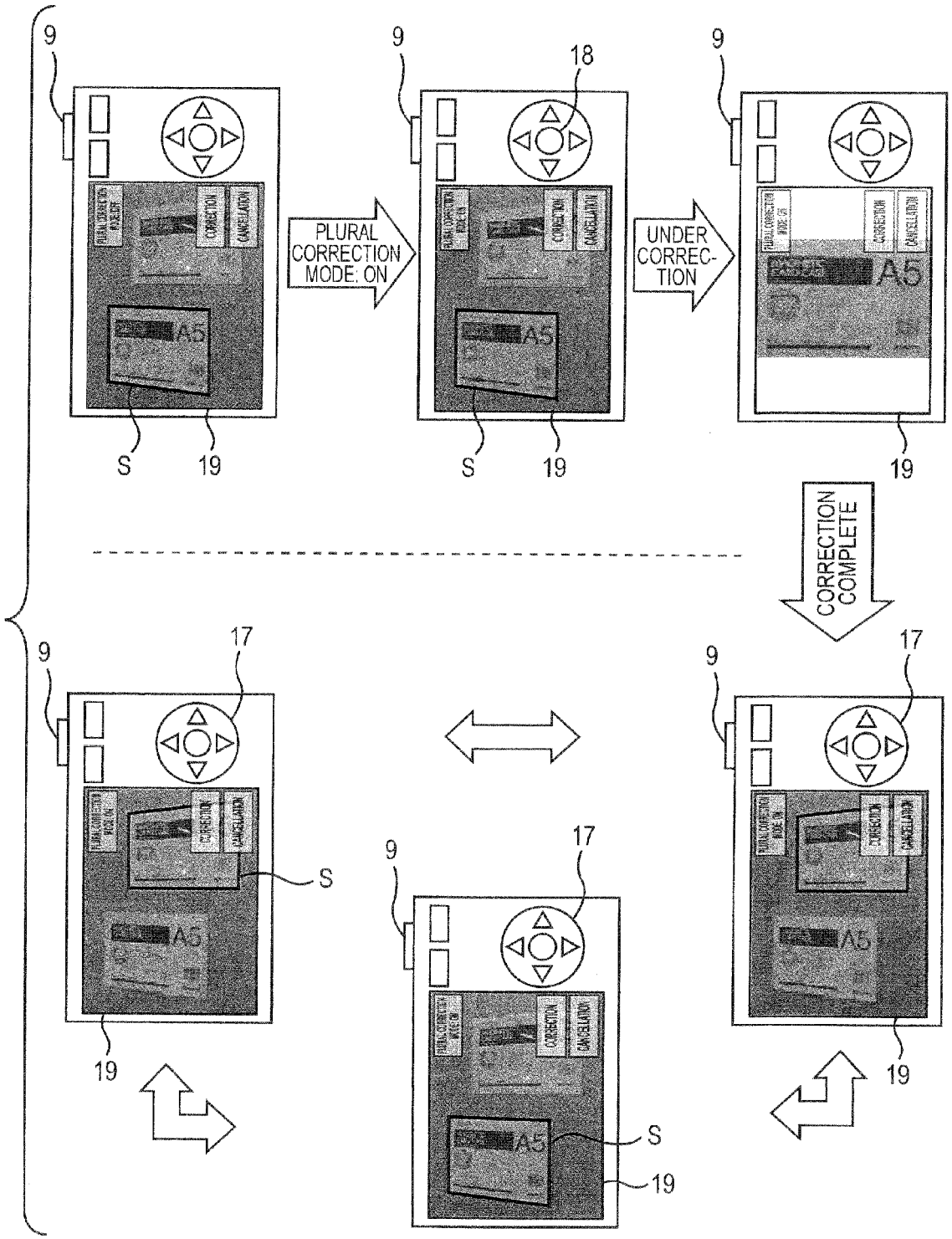
FIG. 17 illustrates a flow of a process that subject images are subjected to image processing based on displayed rectangle candidates.

A captured image may include plural subject images. In view of this, for example, it is possible to prepare an on/off-switchable plural correction mode and allow the user to decide whether to select from plural rectangle candidates. More specifically, where the plural correction mode is off, the image processor 47 displays rectangle candidates, which are arranged imaginarily in descending order of likelihood (cyclically), on the display unit 19 one at a time every time the user operates the ring key 17 (e.g., in a manner shown in see FIG. 16), performs image processing such as coordinate conversion on the pixels in the area enclosed by a rectangle candidate selected by the user, and finishes the contour quadrangle extraction process. Where the plural correction mode is on, for example, the image processor 47 displays rectangle candidates, which are arranged imaginarily in descending order of likelihood (cyclically), on the display unit 19 one at a time every time the user operates the ring key 17 in a manner shown in FIG. 17 (sections (a) and (b)), performs image processing such as coordinate conversion on the pixels in the area enclosed by a rectangle candidate selected by the user (section (c) shown in FIG. 17), and renders selectable the rectangle candidates that were not selected by the user so that further image processing can be performed (sections (d), (e), and (f) shown in FIG. 17). This procedure allows the user to perform image correction while sequentially selecting correct rectangle candidates for plural subjects. Step S13 is thus completed and the contour quadrangle extraction process are finished.

As is apparent from the above description, in the contour quadrangle extraction process according to the first embodiment, the image processor 47 detects pieces of vertical line segment information and pieces of horizontal line segment information from a captured image and generates vertical facing-lines candidates and horizontal facing-lines candidates to constitute quadrangle areas from the detected pieces of vertical and horizontal line segment information. Then, the image processor 47 generates plural pairs of a vertical facing-lines candidate and a horizontal facing-lines candidate and generates, for each pair, a quadrangle area (rectangle candidate S) having, as corner points, intersecting points of the vertical facing-lines candidate and the horizontal facing-lines candidate. Then, the image processor 47 calculates, as a score of each rectangle candidate S, a ratio of a total length L2 of the line segments L constituting the rectangle candidate S to a perimeter length 11 of the rectangle candidate S, and displays the rectangle candidates S one at a time according to the calculated scores to be overlapped on the captured image. As such, the contour quadrangle extraction process can present extracted rectangle candidates S to the user in such a manner that the likelihood of each rectangle candidate S is taken into consideration. Therefore, the digital camera 1 which executes the above-described contour quadrangle extraction process allows the user to select a rectangle candidate S smoothly.

Although in the above description the presentation by concurrent display using different colors and the presentation by sequential (cyclic) display are given as examples of the method for presenting plural rectangle candidates S generated by the contour quadrangle extraction process to the user, the method for presenting plural rectangle candidates S to the user is not limited to any particular method. And it is not always necessary to present all rectangle candidates S generated by the contour quadrangle extraction process to the user; for example, the number of rectangle candidates S to be presented to the user may be limited in such a manner that only a given number of rectangle candidates S selected in order from the highest score are presented. In this case, the number of rectangle candidates S presented to the user can be reduced and hence the user's manipulations of selecting a rectangle candidate S can be prevented from becoming complicated.

In the above description, plural rectangle candidates S generated by the contour quadrangle extraction process are presented to the user and the user is thereafter caused to select a rectangle candidate S to be subjected to later image processing. Alternatively, a rectangle candidate S to be subjected to later image processing may be selected automatically according to calculated scores. In this case, it is not necessary to request the user to make a selection operation, whereby a series of steps including the later image processing can be executed smoothly while user manipulations are simplified.

The image processing which is performed on the pixels in a selected rectangle candidate S after the contour quadrangle extraction process may be any of various kinds of image processing such as skew correction by coordinate conversion, image extraction, enlargement/reduction, contrast adjustment, and level correction or a combination thereof.

Second Embodiment

Next, a second embodiment of the invention will be described. In the above-described first embodiment, plural rectangle candidates S are generated at step S11, scored at step S12, and presented sequentially to the user according to their calculated scores at step S13. The second embodiment is different from the first embodiment in that steps S12 and S13 of the first embodiment are replaced by a step of grouping the plural rectangle candidates S (described below).

The first embodiment is suitable for a case that the number of subject images included in an image, that is, the number of areas in an image each of which is to be selected from rectangle candidates S as an area to be subjected to image processing is one or a few. On the other hand, the second embodiment is suitably applied to an image including a few or more similar subject images. Specific examples of such a case are a case of taking an overview image of a photo album and then extracting each photograph from the image taken and a case of taking a snapshot of a bulletin board having plural memos pinned down and then extracting each memo from the image taken.

In a digital camera 1 according to the second embodiment, after plural rectangle candidates S have been generated from one captured image by the part (steps S1-S11) of the contour quadrangle extraction process according to the first embodiment, they are grouped according to their sets of coordinates of the centers of gravity (hereinafter may be referred to as "center positions") and their sizes (sizes of quadrangle areas) by performing a grouping process described below. How the digital camera 1 operates in performing the grouping process will be described below with reference to a flowchart shown in FIG. 18.

Figure 18:
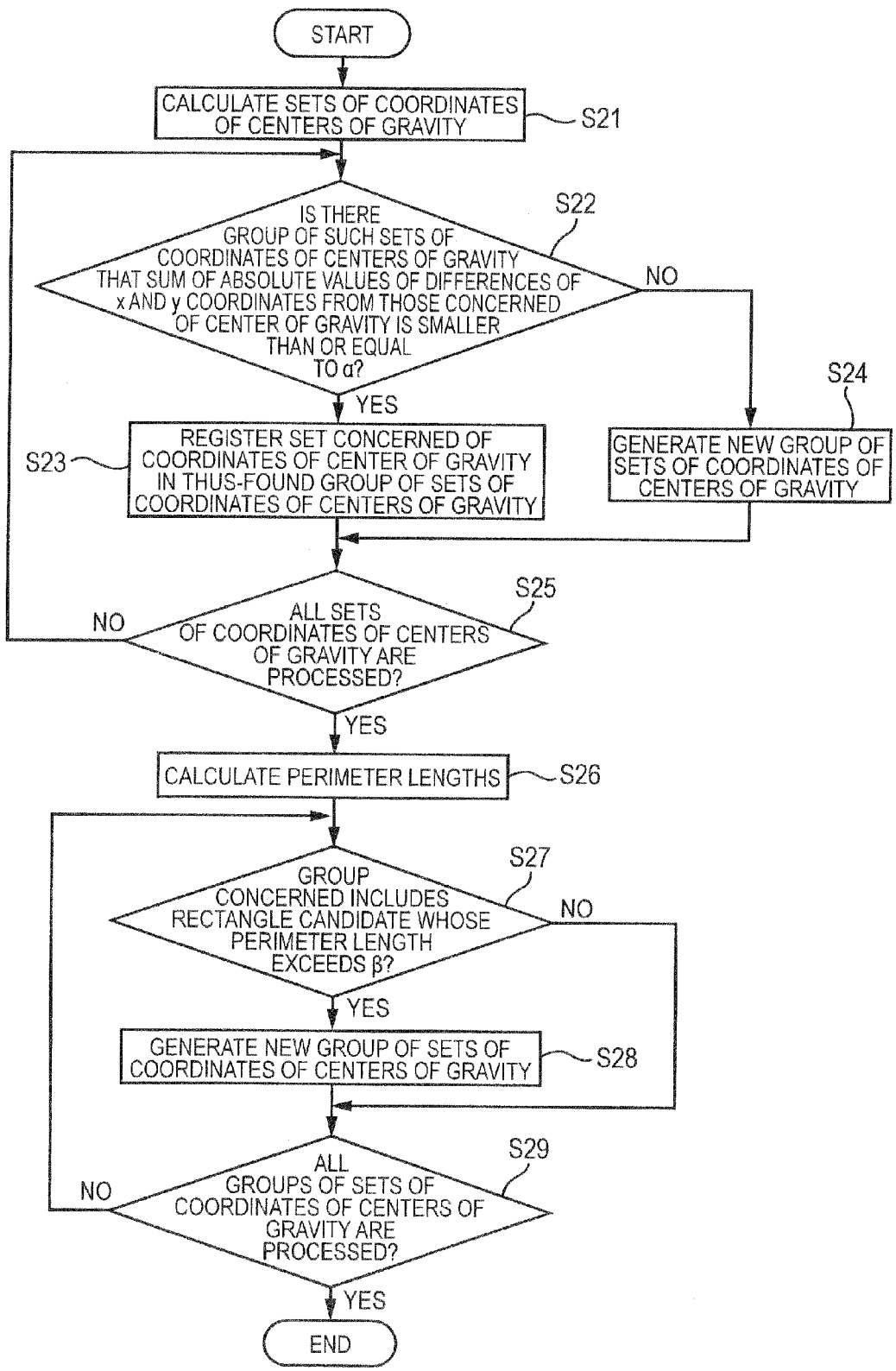
FIG. 18 is a flowchart of a grouping process according to a second embodiment of the invention.

The grouping process shown in FIG. 18 is started from step S21 with timing that step S11 of the above-described contour quadrangle extraction process has completed. The operation to be described below of the digital camera 1 is realized in such a manner that the CPU of the controller 42 loads a computer program stored in the ROM into the RAM and runs it.

Figure 19A:
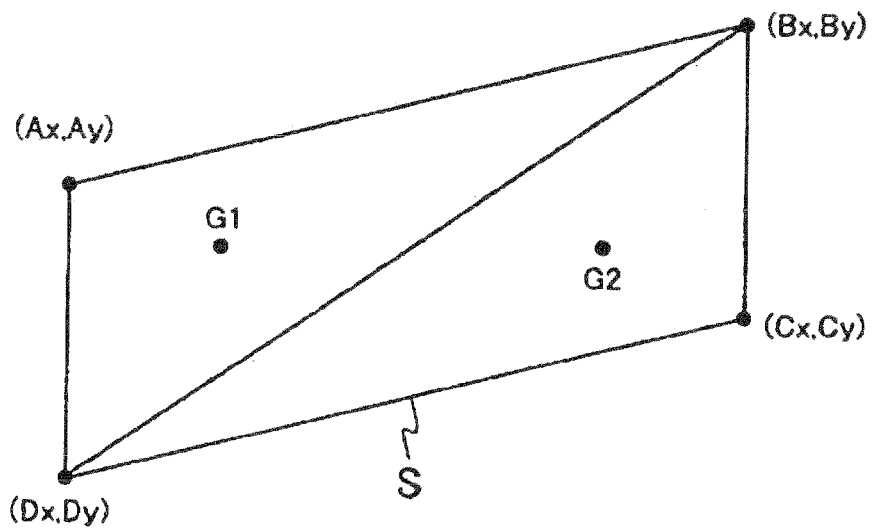
FIGS. 19A and 19B show an example rectangle candidate for description of step S21 of the process shown in FIG. 18.
Figure 19B:
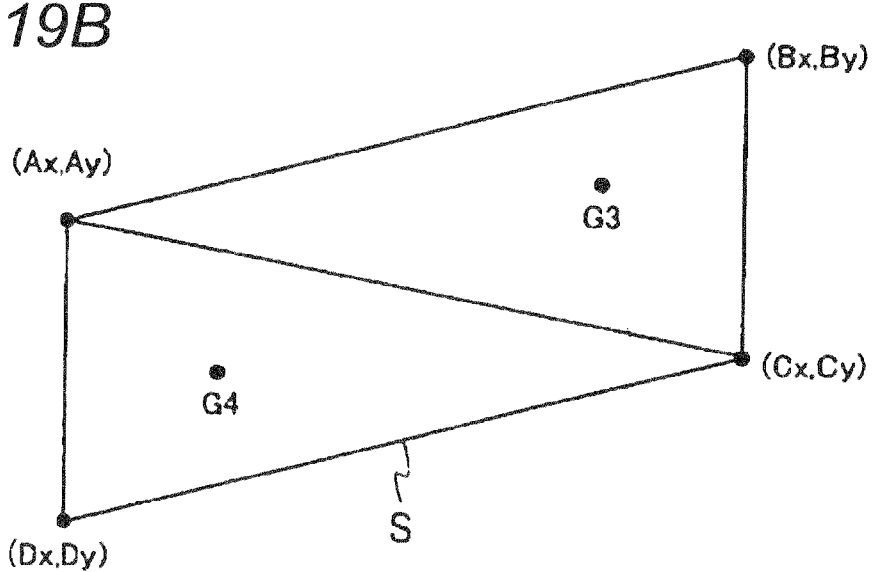

At step S21, the image processor 47 calculates coordinates of the center of gravity of each rectangle candidate S. More specifically, first, the image processor 47 calculates sets of coordinates (Ax, Ay), (Bx, By), (Cx, Cy), and (Dx, Dy) of the corner points of each rectangle candidate S (see FIGS. 19A and 19B) and calculates sets of coordinates of the centers of gravity G1 and G2 of triangles ABD and BDC constituting the rectangle candidate S according to the following Equations (2) and (3) (see FIG. 19A). Then, the image processor 47 calculates sets of coordinates of the centers of gravity G3 and G4 of triangles ABC and ACD constituting the rectangle candidate S according to the following Equations (4) and (5) (see FIG. 19B). Then, the image processor 47 calculates a straight line connecting the centers of gravity G1 and G2 and a straight line connecting the centers of gravity G3 and G4 and calculates an intersecting point K (Kx, Ky) of the two straight lines which is given by the following Equation (6) as coordinates of the center of gravity of the rectangle candidates S. More specifically, when five rectangle candidates S1-S5 have been generated from one captured image by the contour quadrangle extraction process (see FIG. 20A), the image processor 47 calculates sets of coordinates of the corner points and sets of coordinates of the centers of gravity of each of the rectangle candidates S1-S5 (see FIG. 20B). Step S21 is thus completed and the grouping process proceeds to step S22.

$$G1 = ((Ax + Bx + Dx)/3, (Ay + By + Dy)/3)) \quad (2)$$

$$G2 = ((Bx + Dx + Cx)/3, (By + Dy + Cy)/3)) \quad (3)$$

$$G3 = ((Ax + Bx + Cx)/3, (Ay + By + Cy)/3)) \quad (4)$$

$$G4 = ((Ax + Cx + Dx)/3, (Ay + Cy + Dy)/3)) \quad (5)$$

$$\begin{cases} Kx = \dfrac{\left(G3y - \dfrac{G4y - G3y}{G4x - G3x}G3x\right) - \left(G1y - \dfrac{G2y - G1y}{G2x - G1x}G1x\right)}{\dfrac{G2y - G1y}{G2x - G1x} - \dfrac{G4y - G3y}{G4x - G3x}} \\[2ex] Ky = \dfrac{\dfrac{G4y - G3y}{G4x - G3x}\left(G1y - \dfrac{G2y - G1y}{G2x - G1x}G1x\right) - \dfrac{G2y - G1y}{G2x - G1x}\left(G3y - \dfrac{G4y - G3y}{G4x - G3x}G3x\right)}{\dfrac{G2y - G1y}{G2x - G1x} - \dfrac{G4y - G3y}{G4x - G3x}} \end{cases} \quad (6)$$

At step S22, the image processor 47 determines, for the coordinates of the center of gravity of the rectangle candidate S concerned that were calculated at step S21, whether there exists a group of such sets of coordinates of centers of gravity that the sum of the absolute values of the differences of the x and y coordinates from those of the rectangle candidate S concerned is smaller than or equal to a given threshold value α. More specifically, for the coordinates (x1, y1) of the rectangle candidate S1, the image processor 47 determines whether there exists a group of such sets of coordinates (x2, y2) of centers of gravity each of which satisfies the inequality |x1−x2|+|y1−y2|≦α. If there exists a group of such sets of coordinates of centers of gravity that the sum of the absolute values of the differences of the x and y coordinates from those of the rectangle candidate concerned is smaller than or equal to the given threshold value α (i.e., a group of rectangle candidates whose centers of gravity are close to the center of gravity of the rectangle candidate concerned), at step S23 the image processor 47 registers the set concerned of the coordinates of the center of gravity in the thus-found group and moves to step S25. On the other hand, if there is no group of such sets of coordinates of centers of gravity that the sum of the absolute values of the differences of the x and y coordinates from those of the rectangle candidate concerned is smaller than or equal to the given threshold value α, at step S24 the image processor 47 generates a new group of sets of coordinates of centers of gravity and registers the set concerned of coordinates of the center of gravity in the generated new group and moves to step S25. The grouping methods may be any of various methods. One method is to assign identification information unique to a group to attribute information of each set of coordinates of a center of gravity.

At step S25, the image processor 47 determines whether step S22 has been executed for all the sets of coordinates of the centers of gravity calculated at step S21. If determined that step S22 has not been executed yet for all the sets of coordinates of the centers of gravity calculated at step S21, the image processor 47 returns to step S22. If determined that step S22 has been executed for all the sets of coordinates of the centers of gravity calculated at step S21, the image processor 47 moves to step S26.

Figures 20A, 20B:
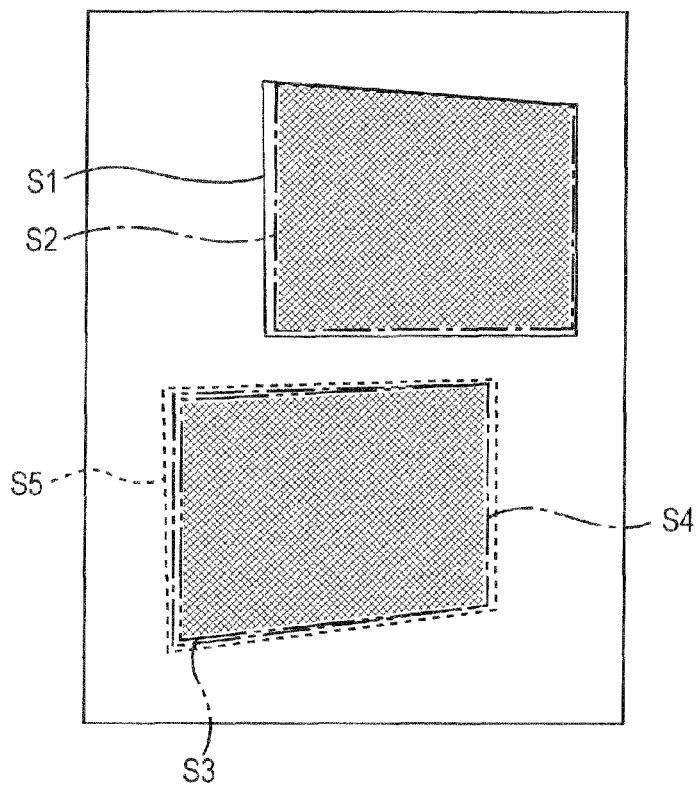
FIG. 20A shows plural example rectangle candidates and FIG. 20B shows calculated sets of coordinates of corner points, coordinates of the center of gravity, and perimeter length of each rectangle candidate.

At step S26, the image processor 47 calculates a perimeter length L of each rectangle candidate S according to Equation 7. More specifically, when the five rectangle candidates S1-S5 have been generated as shown in FIG. 20A, the image processor 47 calculates a perimeter length L of each of the rectangle candidates S1-S5. Step S26 is thus completed and the grouping process proceeds to step S27.

$$L = \sqrt{(Bx-Ax)^2+(By-Ay)^2} + \sqrt{(Dx-Bx)^2+(Dy-By)^2} + \sqrt{(Cx-Dx)^2+(Cy-Dy)^2} + \sqrt{(Ax-Cx)^2+(Ay-Cy)^2} \quad (7)$$

At step S27, the image processor 47 determines whether the group concerned of sets of coordinates of centers of gravity includes a rectangle candidate S whose perimeter length calculated at step S26 exceeds a given threshold value β. If determined that the group concerned includes such a rectangle candidate S, at step S28 the image processor 47 generates a new group of sets of coordinates of centers of gravity (i.e., a group of rectangle candidates that are close to in the coordinates of centers of gravity but different in size from the rectangle candidates of the original group), registers the coordinates of the center of gravity of the rectangle candidate S concerned in the generated new group, and moves to step S29. On the other hand, if determined that the group does not include such a rectangle candidate S, the image processor 47 proceeds the process to step S29.

At step S29, the image processor 47 determines whether step S27 has been executed for all the groups of sets of coordinates of centers of gravity. If determined that step S27 has not been executed yet for all the groups of sets of coordinates of centers of gravity, the image processor 47 returns to step S27. On the other hand, if determined that step S27 has been executed for all the groups of sets of coordinates of centers of gravity, the image processor 47 finishes the grouping process.

As a result of the execution of the grouping process, all the rectangle candidates S included in the one captured image are grouped by the sets of coordinates of the center of gravity (i.e., the center position) and the size.

In the above description, a perimeter length L of each rectangle candidate S is calculated and used as information indicating the size of each rectangle candidate S in grouping the rectangle candidates S. Alternatively, the image processor 47 may group rectangle candidates S using, as information indicating the size of each rectangle candidate S, the average Z of the lengths of the four sides of each rectangle candidate S, the internal area of each rectangle candidate S, the average of the lengths of the diagonals of each rectangle candidate S, or the like, instead of the perimeter length L.

By performing the following rectangle candidate selection process after completion of the grouping process, the digital camera 1 allows the user to select a rectangle candidate S smoothly even in the case where plural rectangle candidates S exist in one captured image. How the digital camera 1 operates in performing this selection process will be described below with reference to a flowchart shown in FIG. 21.

Figure 21:
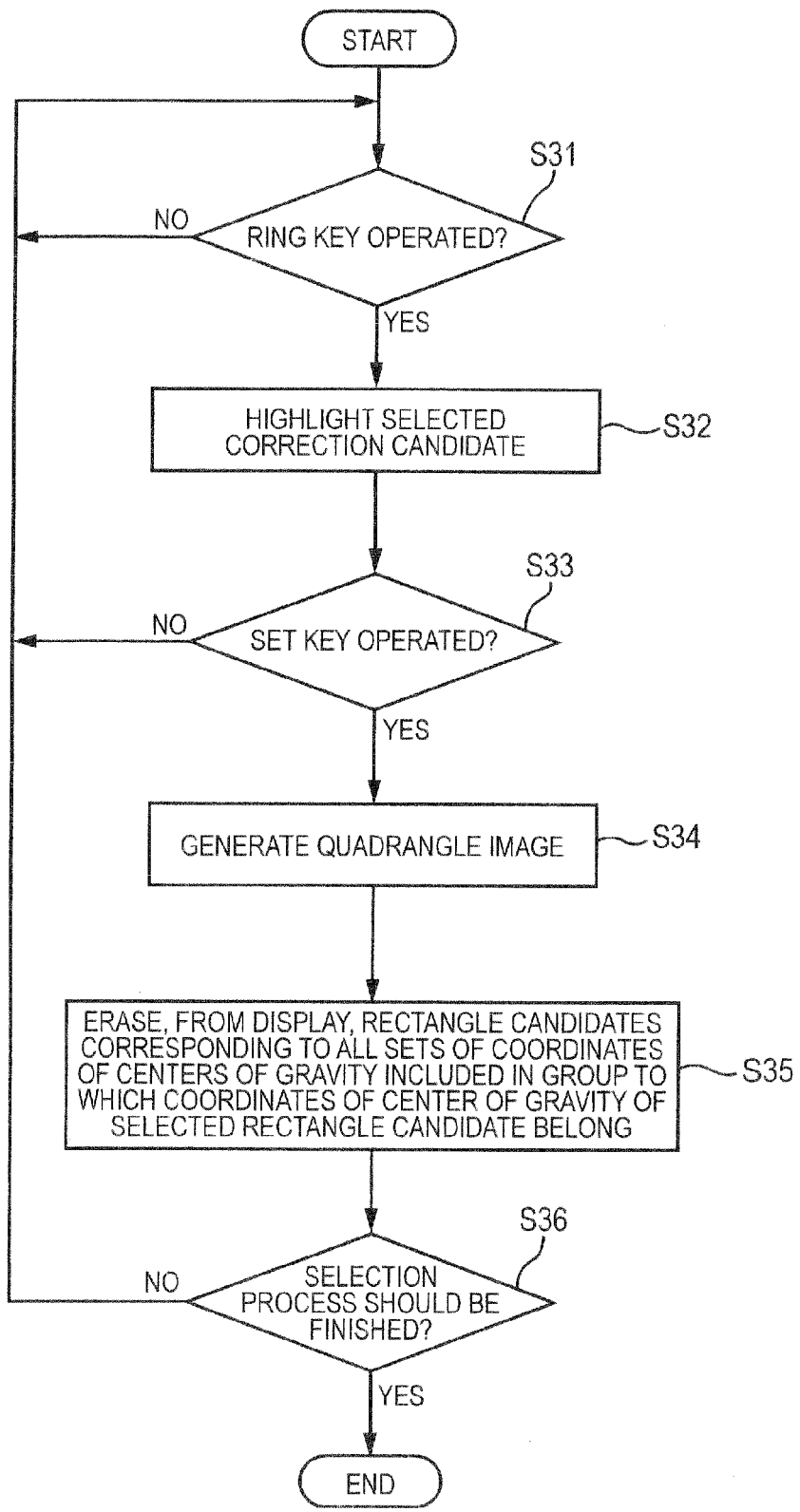
FIG. 21 is a flowchart of a rectangle candidate selection process according to the second embodiment.
Figure 22:
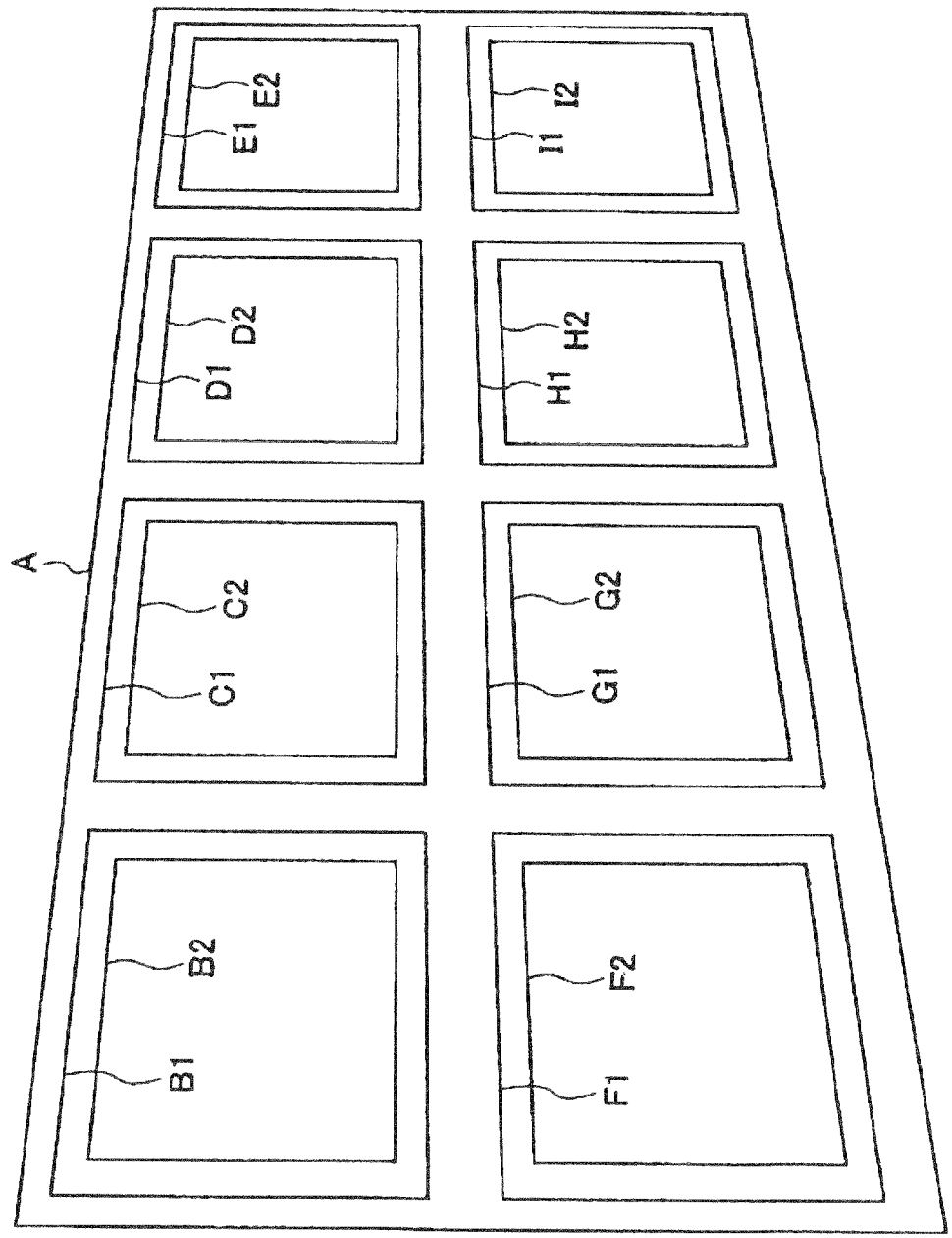
FIG. 22 shows plural example rectangle candidates.
Figure 23:
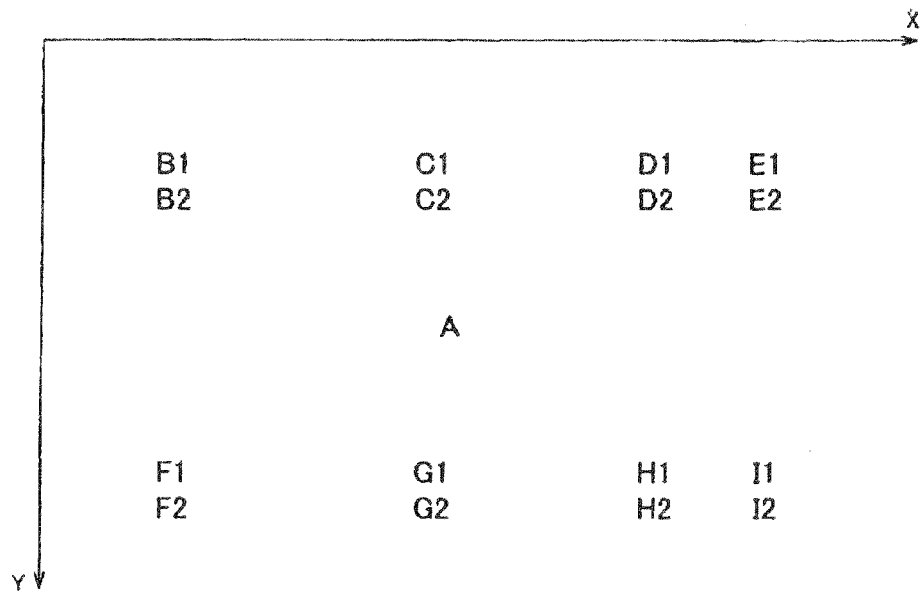
FIG. 23 shows a result of grouping of the plural rectangle candidates shown in FIG. 22 by the coordinates of the center of gravity.
Figure 24:
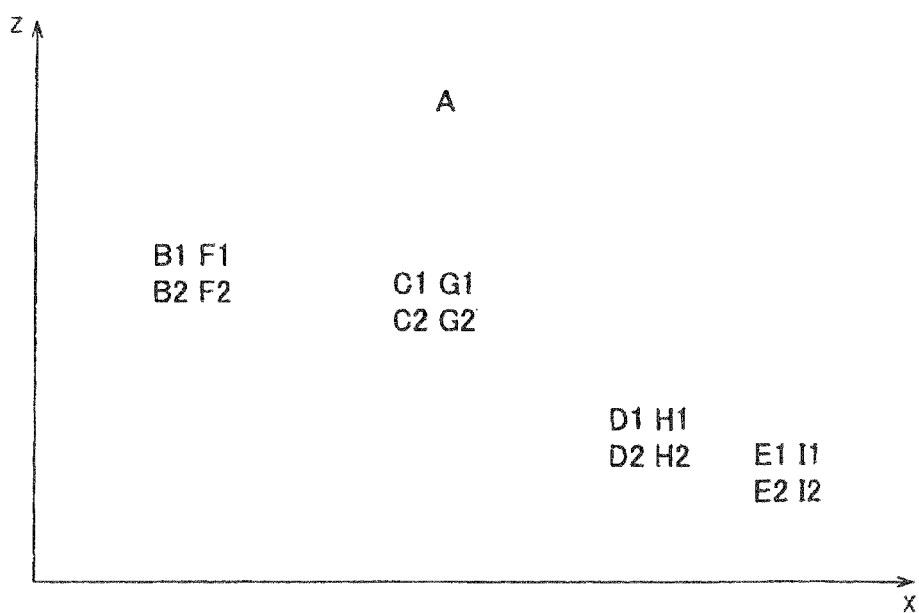
FIG. 24 shows a result of grouping of the plural rectangle candidates shown in FIG. 22 by the x coordinate of the center of gravity and the size.
Figure 25:
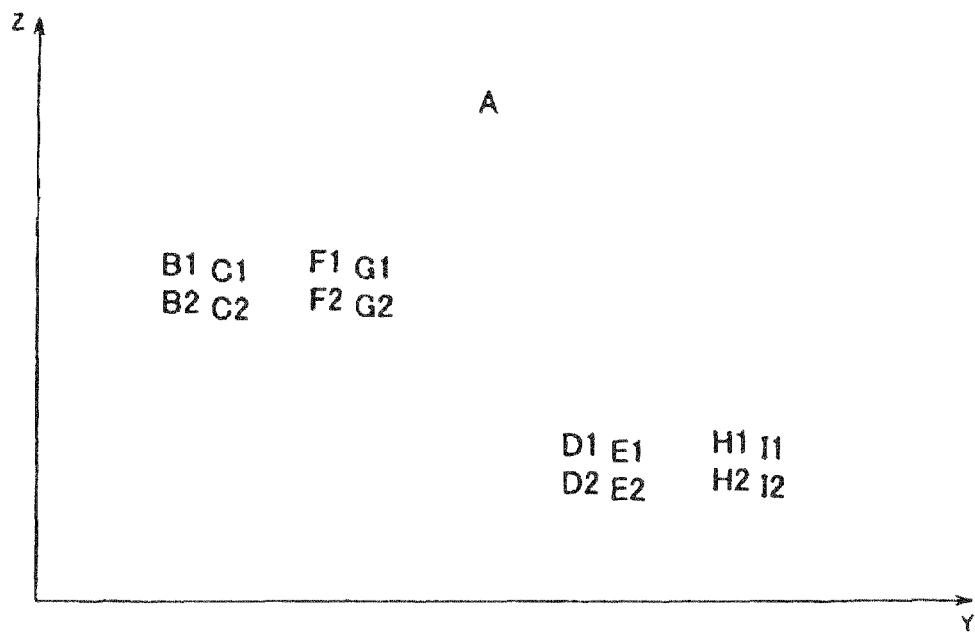
FIG. 25 shows a result of grouping of the plural rectangle candidates shown in FIG. 22 by the y coordinate of the center of gravity and the size.

The selection process shown in FIG. 21 is started from step S31 with timing that the above-described grouping process has completed. The selection process will be described below in a specific manner by using an example that a total of 17 rectangle candidates A, B1, B2, C1, C2, D1, D2, E1, E2, F1, F2, G1, G2, H1, H2, I1, and I2 have been extracted as shown in FIG. 22 and grouped by each of combinations from the coordinates (x, y) of the center of gravity and the size z (the average of the lengths of the four sides) as shown in FIGS. 23-25. The operation to be described below of the digital camera 1 is realized in such a manner that the CPU of the controller 42 loads a computer program stored in the ROM into the RAM and runs it.

At step S31, the controller 42 determines whether the ringing key 17 has been operated. The controller 42 proceeds the process to step S32 with timing that the ringing key 17 has been operated.

At step S32, the controller 42 highlights a rectangle candidate (correction candidate) selected by the ring key 17 to render the selected rectangle candidate visually recognizable. More specifically, if the largest rectangle candidate A shown in FIG. 22 has been selected by the ring key 17, the controller 42 highlights the rectangle candidate A by changing the color of its frame from white to green. Step S32 is thus completed and the selection process proceeds to step S33.

At step S33, the controller 42 determines whether the user has selected the rectangle candidate, which was selected by the user at step S32 by pressing the set key 18, as the correction candidate. If determined that the user has not pressed the set key 18, the controller 42 returns to step S31. If determined that the user has pressed the set key 18, the controller 42 proceeds the process to step S34.

In the example shown in FIG. 22, if the user makes a downward operation on the ring key 17 instead of operating the set key 18 in a state that the rectangle candidate A is selected, the controller 42 highlights the rectangle candidate B1 which belongs to the group whose size is closest to the size of the rectangle candidate A (i.e., the group that is closest to the rectangle candidate A in the Z-axis direction) based on the grouping results shown in FIGS. 24 and 25. If the user makes a downward operation again on the ring key 17 in a state that the rectangle candidate B1 is highlighted, the controller 42 highlights the rectangle candidate B2 which belongs to the same group as the rectangle candidate B1 in the XY plane.

On the other hand, if the user makes a rightward operation on the ring key 17 in a state that the rectangle candidate B1 is highlighted, the controller 42 highlights the rectangle candidate C1 which belongs to the same group as the rectangle candidate B1 in the Z-axis direction and belongs to the group adjacent in clockwise direction on the XY plane (i.e., the group which is close in center position to the group of the rectangle candidate B1). If the user makes a leftward operation on the ring key 17 in a state that the rectangle candidate B1 is highlighted, the controller 42 highlights the rectangle candidate F1 which belongs to the same group as the rectangle candidate B1 in the Z-axis direction and belongs to the group adjacent in counterclockwise direction on the XY plane (i.e., the group which is close in center position to the group of the rectangle candidate B1).

Figure 26:
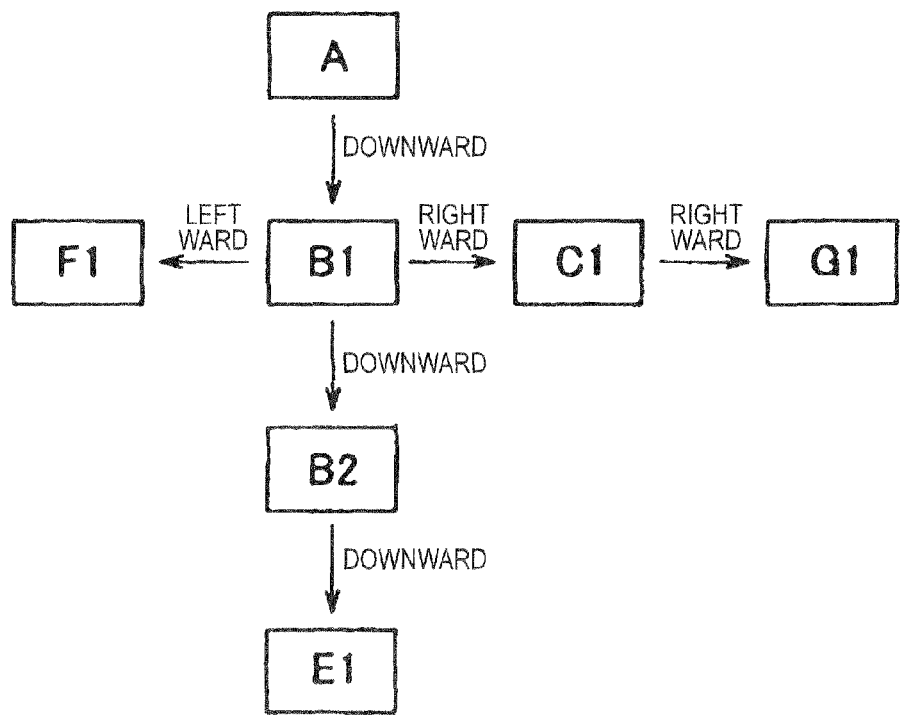
FIG. 26 shows example state transitions of the selection process.

If the user makes a rightward operation on the ring key 17 in a state that the rectangle candidate C1 is highlighted, the controller 42 highlights the rectangle candidate G1 which belongs to the same group as the rectangle candidate C1 in the Z-axis direction and belongs to the group adjacent in clockwise direction on the XY plane. In causing a transition from one group to another in the Z-axis direction, the controller 42 highlights a rectangle candidate in the destination group after causing a given offset. This measure is taken because when the user is searching for a rectangle candidate while changing the rectangle candidate size, it is meaningless to highlight a correction candidate that is approximately the same in size as and different in position from the current one. More specifically, after the rectangle candidate B2, the controller 42 highlights the rectangle candidate E1 rather than one of the rectangle candidate C1, C2, G1, and G2 which are smaller than the rectangle candidate B2 only a little. FIG. 26 shows example transitions as described above.

At step S34, the image processor 47 calculates a projective transformation matrix for a quadrangle area that is the rectangle candidate determined at step S33, and generates a quadrangle image by applying the calculated projective transformation matrix to the rectangle candidate and the pixels enclosed by the rectangle candidate. Step S34 is thus completed and the selection process proceeds to step S35.

At step S35, the image processor 47 erases, from the display, the rectangle candidates corresponding to all the sets of coordinates of centers of gravity included in the group to which the coordinates of the center of gravity of the rectangle candidate determined at step S33 belong. Step S35 is thus completed and the selection process proceeds to step S36.

At step S36, the controller 42 determines whether the user has given an instruction to finish the selection process by operating the user interface 49. If determined that the user has not given an instruction to finish the selection process, the controller 47 returns to step S31. On the other hand, if determined that the user has given an instruction to finish the selection process, the controller 42 finishes the selection process.

As is apparent from the above description, in the digital camera 1 according to the second embodiment, the image processor 47 groups plural rectangle candidates S by the coordinates of the center of gravity and the size. When a rectangle candidate S to be subjected to image processing is selected from the plural rectangle candidates S, the image processor 47 stops displaying the rectangle candidates S belonging to the same group as the selected rectangle candidate S according to results of the grouping process. This configuration allows the user to select a desired rectangle candidate smoothly even in the case where there exist plural rectangle candidates S that differ from each other only a little in center position or size.

Although each of the first and second embodiments is directed to the digital camera, the invention can also be applied to a digital video camera for taking a moving image, an image processing apparatus not having an imaging portion, or the like. That is, the contour quadrangle extraction process according to each of the above embodiments may be executed after an image taken by an external image capturing device is taken in by using a memory card, a USB cable, or the like. In each of the above embodiments, correction by coordinate conversion is performed after rectangle candidates are presented to the user in descending order of scores and one of them is selected by the user. An alternatively procedure is possible in which rectangle candidates are corrected by coordinate conversion in descending order of scores while correction results are presented to the user sequentially and the user selects a most preferable one.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all of the components shown in each embodiment. Further, components in different embodiments may be used appropriately in combination.

What is claimed is:

1. An image processing apparatus comprising:
   a line segment detecting unit configured to detect vertical line segments and horizontal line segments in an image;
   a facing-lines candidate generating unit configured to generate vertical facing-lines candidates and horizontal facing-lines candidates from the vertical line segments and the horizontal line segments, the vertical facing-lines candidates and horizontal facing-lines candidates being candidates for pairs of facing lines configuring quadrangle areas in the image;
   a rectangle candidate generating unit configured to generate a plurality of pairs of one of the vertical facing-lines candidates and one of the horizontal facing-lines candidates, and to generate the quadrangle areas as rectangle candidates, the quadrangle areas having intersecting points of each pair of the vertical facing-lines candidates and the horizontal facing-lines candidates as four corner points; and
   a calculating unit configured to calculate likelihood of each of the rectangle candidates based on a relationship between line segments constituting the vertical facing-lines candidates and the horizontal facing-lines candidates and the rectangle candidates.

2. The apparatus according to claim 1, wherein the calculating unit is configured to calculate the likelihood based on a ratio of a total length of parts of the vertical facing-lines candidates and the horizontal facing-lines candidates with respect to a perimeter length of the rectangle candidate, the parts being located on circumferential edges of each of the rectangle candidates.

3. The apparatus according to claim 2, wherein the calculating unit is configured to reduce the likelihood by a given point when a line segment comprised in the vertical facing-lines candidates or the horizontal facing-lines candidates is extending beyond one of the four corner points to project outward from the rectangle candidate.

4. The apparatus according to claim 1, wherein the facing-lines candidate generating unit is configured to generate the vertical facing-lines candidates and the horizontal facing-lines candidates by setting a pair of a first line segment and a second line segment as one of the vertical facing-lines candidates and the horizontal facing-lines candidates, the first line segment and the second line segment being included in the vertical line segments or the horizontal line segments,
   wherein the first line segment and the second line segment having a distance larger than a given threshold, and
   wherein a ratio between lengths of the first line segment and the second line segment is within a given range.

5. The apparatus according to claim 1 further comprising a display controlling unit configured to control a display device to display the rectangle candidates overlapped on the image based on the likelihood calculated by the calculating unit.

6. The apparatus according to claim 5, wherein the display controlling unit is configured to control the display device to display the rectangle candidates in descending order of the likelihood calculated by the calculating unit.

7. The apparatus according to claim 5, wherein the display controlling unit is configured to control the display device to display the rectangle candidates in different colors based on the likelihood calculated by the calculating unit.

8. The apparatus according to claim 1 further comprising an imaging device configured to capture the image.

9. An image processing apparatus comprising:
   a rectangle candidate generating unit configured to generate a plurality of quadrangle areas as rectangle candidates in an image;
   a grouping unit configured to group the rectangle candidates based on center positions and sizes;
   a display unit configured to display the rectangle candidates to be overlapped on the image;

a first operating unit configured to select a selected rectangle candidate from among the rectangle candidates being displayed by the display unit;

a second operating unit configured to determine the selected rectangle candidate as a determined rectangle candidate to be used in later processing; and a display controlling unit configured to control the display unit to stop displaying the rectangle candidates included in a group to which the selected rectangle candidate belongs when the second operating unit determines the determined rectangle candidate in the group.

10. The apparatus according to claim 9, wherein the first operating unit has a first operation direction and a second operation direction, wherein the display controlling unit controls the display unit to display other rectangle candidates, which belong to a first group to which a rectangle candidate currently being displayed in a selected state belongs in the selected state, in order in the selected state as the first operating unit is operated in the first operation direction, and wherein the display controlling unit controls the display unit to display other rectangle candidate, which belongs to a second group different from the first group, in the selected state when the first operating unit is operated in the second operation direction.

11. The apparatus according to claim 10, wherein the display controlling unit is configured to control the display unit to display other rectangle candidate belonging to the second group in the selected state when the first operating unit is operated in the second operation direction, the second group being a group to which a rectangle candidate that is larger in size for more than a given value belongs.

12. The apparatus according to claim 9 further comprising an imaging device configured to capture the image.

13. A computer readable medium storing a software program that causes a computer to perform image processing comprising:

detecting vertical line segments and horizontal line segments in an image;

generating vertical facing-lines candidates and horizontal facing-lines candidates from the vertical line segments and the horizontal line segments, the vertical facing-lines candidates and horizontal facing-lines candidates being candidates for pairs of facing lines configuring quadrangle areas in the image;

generating a plurality of pairs of one of the vertical facing-lines candidates and one of the horizontal facing-lines candidates to generate the quadrangle areas as rectangle candidates, the quadrangle areas having intersecting points of each pair of the vertical facing-lines candidates and the horizontal facing-lines candidates as four corner points; and calculating likelihood of each of the rectangle candidates based on a relationship between line segments constituting the vertical facing-lines candidates and the horizontal facing-lines candidates and the rectangle candidates.

14. A computer readable medium storing a software program that causes a computer to perform image processing comprising:

generating a plurality of quadrangle areas as rectangle candidates in an image;

grouping the rectangle candidates based on center positions and sizes;

displaying the rectangle candidates to be overlapped on the image;

stop displaying the rectangle candidates included in a group to which a selected rectangle candidate being selected from among the rectangle candidates being displayed belongs when a rectangle candidate to be used in later processing is determined as the selected rectangle candidate.

\* \* \* \* \*